United States Patent
Szoke et al.

(10) Patent No.: US 9,183,364 B2
(45) Date of Patent: Nov. 10, 2015

(54) INTELLIGENT PERIPHERAL DEVICE AND SYSTEM FOR THE AUTHENTICATION AND VERIFICATION OF INDIVIDUALS AND/OR DOCUMENTS THROUGH A SECURE MULTIFUNCTIONAL AUTHENTICATION SERVICE WITH DATA STORAGE CAPABILITY

(75) Inventors: Thomas Szoke, Apopka, FL (US); Daniel Fozzati, Boston, MA (US); Andras Vago, Budapest (HU)

(73) Assignee: Innovation in Motion, Inc., Apopka, FL (US)

( * ) Notice: Subject to any disclaimer, the term of this patent is extended or adjusted under 35 U.S.C. 154(b) by 643 days.

(21) Appl. No.: 13/390,113

(22) PCT Filed: Aug. 13, 2010

(86) PCT No.: PCT/US2010/045443
§ 371 (c)(1), (2), (4) Date: Feb. 13, 2012

(87) PCT Pub. No.: WO2011/019996
PCT Pub. Date: Feb. 17, 2011

(65) Prior Publication Data
US 2012/0139703 A1   Jun. 7, 2012

Related U.S. Application Data

(60) Provisional application No. 61/274,139, filed on Aug. 13, 2009.

(51) Int. Cl.
| | | |
|---|---|---|
| G06F 7/04 | (2006.01) |
| G06F 21/32 | (2013.01) |
| G06F 21/34 | (2013.01) |
| H04L 29/06 | (2006.01) |
| H04W 12/06 | (2009.01) |
| H04W 12/04 | (2009.01) |

(52) U.S. Cl.
CPC .............. *G06F 21/32* (2013.01); *G06F 21/34* (2013.01); *H04L 63/0861* (2013.01); *H04W 12/06* (2013.01); *H04W 12/04* (2013.01)

(58) Field of Classification Search
CPC ........ G06F 21/32; G06F 21/34; H04W 12/06; H04W 12/04; H04L 63/0861
USPC ........................................................ 340/5.83
See application file for complete search history.

(56) References Cited

U.S. PATENT DOCUMENTS

| | | | | |
|---|---|---|---|---|
| 6,772,331 | B1* | 8/2004 | Hind et al. ................ | 713/151 |
| 2003/0215114 | A1* | 11/2003 | Kyle ........................ | 382/115 |
| 2004/0139329 | A1* | 7/2004 | Abdallah et al. ........ | 713/182 |
| 2004/0233040 | A1 | 11/2004 | Lane et al. | |
| 2005/0038755 | A1* | 2/2005 | Silverbrook et al. ..... | 705/67 |
| 2006/0017959 | A1* | 1/2006 | Downer et al. .......... | 358/1.14 |

(Continued)

*Primary Examiner* — Travis Hunnings
*Assistant Examiner* — Naomi Small
(74) *Attorney, Agent, or Firm* — Bay State IP, LLC

(57) ABSTRACT

A device possessing a secure multifunctional authentication service integrated with data storage capability, wherein the device is a multifunctional intelligent peripheral or accessory device, which, upon implementation into a system, is disposed to control a set of transactions that the system is designated to perform by the device, in conjunction with a data transfer medium which is under the control of the device.

23 Claims, 23 Drawing Sheets

(56) References Cited

U.S. PATENT DOCUMENTS

| | | | |
|---|---|---|---|
| 2006/0157559 A1* | 7/2006 | Levy et al. | 235/380 |
| 2007/0055877 A1* | 3/2007 | Persson et al. | 713/171 |
| 2007/0260886 A1* | 11/2007 | Dufour | 713/186 |
| 2008/0065892 A1* | 3/2008 | Bailey et al. | 713/171 |
| 2008/0144947 A1* | 6/2008 | Alasia et al. | 382/232 |
| 2008/0215890 A1* | 9/2008 | Buer | 713/186 |
| 2008/0307503 A1* | 12/2008 | Waters | 726/4 |
| 2009/0293116 A1* | 11/2009 | DeMello et al. | 726/17 |

\* cited by examiner

INTELLIGENT PERIPHERAL DEVICE AND SYSTEM FOR THE AUTHENTICATION AND VERIFICATION OF INDIVIDUALS AND/OR DOCUMENTS THROUGH A SECURE MULTIFUNCTIONAL AUTHENTICATION SERVICE WITH DATA STORAGE CAPABILITY

CROSS REFERENCE TO RELATED APPLICATION

This application is for entry into the U.S. National Phase under §371 for International Application No. PCT/US2010/045443 having an international filing date of Aug. 13, 2010, and from which priority is claimed under all applicable sections of Title 35 of the United States Code including, but not limited to, Sections 120, 363, and 365(c), and which in turn claims priority under 35 USC 119 to U.S. patent application No. 61/274,139 filed on Aug. 13, 2009.

BACKGROUND OF THE INVENTION

1. Field of the Invention

This invention relates generally to devices and methods for identification, verification and authentication of individuals and/or documents, and more particularly to a device possessing a secure multifunctional authentication service integrated with data storage capability, wherein the device is disposed to comprise a multifunctional intelligent peripheral or accessory device, which, upon implementation into a system, is disposed to control a set of transactions that the system is designated to perform by the device, in conjunction with a data transfer medium which is under the control of the device.

2. Description of the Related Art

In 1987, MITRE Corporation prepared a review of Technologies for National Crime Information Center (NCIC) 2000. This review was used as the framework for building the NCIC 2000 program. A significant part of that review addressed the need for law enforcement patrol officers to have the ability to transmit and receive fingerprint and photo information. The review recommended, "The FBI undertake to capture, store, and transmit fingerprint images in a digital form, either binary or in gray scale of the two thumb impressions of a subject in the wanted or missing person file." It was further recommended, "The FBI conduct a study to determine the most cost effective transmission system for photograph, fingerprints, text, and other FBI services that would satisfy user requirements for rapid response using the NCIC 2000 system.

Although the NCIC 2000 project has now been fulfilled and upgrades to the system have been established, the area of fingerprint transmission and other supporting recommendations have not been successfully implemented. Based on surveys taken at the time these capabilities were among the highest priority for implementation. A proof of concept demonstration was conducted in 1989 in three locations, but the required technology to successfully initiate the project was not available.

Increasing demands on law enforcement have made it even more imperative that officers possess access to critical identification information, which includes positive identification by fingerprint, independent of the location of an officer. With the advent of the wireless infrastructure, it is no longer necessary to rely on land based telephone lines to for reliable communication. Wireless systems provide the officers with access to critical information via handheld devices that are available at any location. The officer can access and retrieve data using streamlined interfaces that utilize modern query software. Thus, the officer has immediate access to databases, not only in the immediate organization, but also to other databases such as NCIC-2000 or the State Department of Motor Vehicles.

The primary interest in a mobile/wireless fingerprint capability has been for real-time positive identification purposes by law enforcement personnel performing 1:N searches to determine the identity of a suspect and link that identity to other already determined suspect information. Changes in world events have brought about an increased need to verify the identity of individuals and link these individuals to documents that establish their identity. In these circumstances a 1:1 comparison to verify the claimed identity is sufficient. The need to verify identity may vary from security to fraud prevention to border control. Civil applications such as public aid, customs, immigration, passport, and healthcare ID verification as well as commercial enterprises (banks and credit cards) are areas wherein mobile/wireless fingerprinting may be applied.

Outside the United States, governments are developing new electronic border control solutions, specifically in the European Union ("EU"), where starting in 2012 the use of EU electronic passports shall enable the use of un-manned gates for entry and exit from the Schengen zone for its citizens. The EU shall also enable the use of e-visa and e-passport and e-id entry and exit for non-EU nationals. These stations will be manned; however the personnel will require special equipment to process these transactions. At fixed locations like airports, standard computing technology with biometric and secure credential reading accessories will suffice, however at land border crossings and seaports, a handheld configuration will be required. Thus, the scenarios wherein border guards need to check people on trains, buses or vessels need to be addressed.

Today, several systems have been implemented using mobile wireless technology, however all deployments except the Los Angeles Police Department ("LAPD") use specialized Personal Digital Assistant ("PDA") equipment. LAPD uses the Cogent "BlueCheck" device, which is an accessory to a Smartphone or PDA. Its function is limited to capturing fingerprints and the Smartphone or PDA only forwards the information to a central Automated Fingerprint Identification System ("AFIS"). Therefore, with increased focus on Border Control and the use of secure electronic credentials, there is a need for these mobile handheld devices to incorporate more than just biometric identification.

In addition, there is a need for officers to be able to capture both printed and electronically stored information from secure credentials and then use this information to validate the authenticity of the credentials, to ascertain the holder's correct identity, and finally to establish whether the identified holder is in a national or even the international databases.

SUMMARY OF THE INVENTION

The instant invention, as illustrated herein, is clearly not anticipated, rendered obvious, or even present in any of the prior art mechanisms, either alone or in any combination thereof.

The instant invention provides for an intelligent peripheral device possessing a secure multifunctional authentication service integrated with data storage capability, wherein the device is disposed to comprise a multifunctional intelligent peripheral or accessory device, which, upon implementation into a system, is disposed to control a set of transactions that the system is designated to perform by the device, in conjunction with a data transfer medium which is under the control of the device.

The instant invention provides for a device for the authentication and verification of individuals and/or documents through a secure multifunctional authentication service with data storage capability, wherein the device is disposed to be in data communication with a plurality of remote databases through a data transfer medium. In one embodiment the data transfer medium may be defined as a medium for the transfer of a plurality of information from the device to the remote databases. Furthermore, the device includes a secure information exchange device to allow for the secure pairing and operation between the device and the data transfer medium, wherein the secure information exchange device ("SIED") enables the creation of a trusted and encrypted environment between the device and the data transfer medium, preferably for the identification, verification and authentication of individuals and/or documents.

The instant invention provides the requirements of both a 1:N and 1:1 biometric application, in combination with the need to conduct searches using demographic data and validate an individual's identity through a plurality of stored biometric information in the electronic credential using the newly established Extended Access Control ("EAC") protocols.

The instant application possesses the ability to perform a plurality of biometric functions, depending on a particular situation and/or the requirements of an operator of the instant invention, wherein the functions, include but are not limited to the following:

1:N Local Identification
1:N Remote Identification
1:1 Local Verification
1:1 Remote Verification In addition, a special credential authentication function allows the operator of the instant invention to obtain information as to the authenticity of the secure credential of a subject in question; these credentials include, but are not limited to:

E-Passports
Standard Passports
National Identifications
Drivers Licenses

An operator of the instant invention may select any combination of or all of these functions to meet their needs. As this is the case, the device is configurable to accommodate any combination of the main functions along with their sub-functions.

Identification with a Limited Device Only Database
(1:Few and Local Search)

The instant invention is disposed to allow for the storage of a plurality of databases including, but not limited to a watch list, fingerprint and/or Denied Persons List ("DPL") or other type of subset database. This embodiment allows for the operator of the instant invention to identify subjects, preferably in situations where communications may be limited including, but not limited to, remote areas or buildings wherein communication signals are not reliable. Furthermore, this embodiment may be utilized in a scenario wherein a specific set of individuals are being searched against, as opposed to single entity.

The solution provides for the means to update the plurality of databases stored on the device by the operator via the data transfer medium. Furthermore, each device is disposed to be uniquely identifiable in order that it may be discerned the identity of the device that accesses the database information. Moreover, the database(s) are encrypted when stored on the device and the device is disposed to delete any database information, should the device encounter tampering and/or use with out proper authorization.

The operator is able to run the following scenarios using this function:

1. Fingerprint ("FP") search Only—FP captured and are searched on the accessory;
2. Demographic Search Only—Demographic data is captured via a machine readable zone ("MRZ") reader on the device if an Optical Character Recognition ("OCR") is available; via a Radio Frequency Identification ("RFID") reader of the device if a contactless chip is available; or the data may be manually entered by an operator of the instant invention through a keyboard 29 located on the device 12; and,
3. FP and Demographic Search.

Identification (1:N Remote and Central Database Searches)

This solution provides the capability to perform searches against designated segments of databases using records transmitted from the device, which is in data communication with the remote databases through the data transfer medium. The 1:N FP solution allows an operator of the system to capture fingerprints of unknown subjects in the field. Once a fingerprint is captured, the instant invention is disposed to transmit the fingerprint to a central AFIS site for searching. Following transmission, a hit/no hit response is returned to the device; if available, a photo of the subject may also be returned.

The Central Database Search allows operators of the instant invention to obtain demographic data from the subject in the field (which may be obtained by visual inspection of an individual's credentials or by reading the credentials via either the OCR, or RFID chip, located within the device).

The operator is able to perform a plurality of searches by using this function, including but not limited to:

1. FP Search Only
   a) Depending on the laws of the country, a 1:N FP search is done to determine whether or not an individual requiring identification is in a database. Depending on the reason for the identification and the laws of the country the 1:N search may be with the National or State (US) AFIS, or it may also be submitted to an EU central AFIS like BIS, Interpol or Eurodac or in the US to the FBI.
   b) The operator of the system should have the ability to selectively conduct search(s) from the AFIS databases they are authorized to access; they should also be able to select the order in which the AFIS databases are searched against.
2. A Demographic Search Only
   a) This search can be conducted in one or several different databases, depending on what the operator initiates and the type of information available from the individual in question. Some examples of this type of search include but are not limited to:
      i. Denied Persons List
      ii. Wants and Warrants (US)
      iii. Watch List
      iv. Driver License
      v. Vehicle Reg.
      vi. Weapons Reg. etc.
   b) The operator will have the ability to selectively conduct search(s) from the databases they are authorized to access; they should also be able to select the order in which the databases as searched against.
3. A Demographic and FP Search—This search may combine the functions of the two previous functions. The operator will be able to select which type of search is done first.

Verification and/or Authentication (1:1 Local and Document Authentication)

This solution allows for the confirmation of an individual's identity preferably through a biometric verification and/or credential authentication. This embodiment requires the use of a smart card/e-passport or other machine readable imbedded biometric solution. When a subject possesses this form of identification, the operator should be able to verify the identity of the subject with the offered credential, and also verify the authenticity of the credential. In this case the operator responsible for performing the task would be able to acquire a reference fingerprint from the credential of the subject along with any other appropriate identification and/or photo image information. The device would also be able to capture a fingerprint from the subject for the purpose of comparing the two images. The newly captured search print image is processed in the device, and the fingerprint minutia is disposed to be extracted and compared against the reference fingerprint. If the two prints are a match, the person's identity has been verified.

As the authentication is done against a database of valid documents issued by the different governments and this database is regularly updated, the device will be capable of obtaining updates either via a data transfer medium. As with the other databases stored on the device, the device itself is uniquely identifiable so that it can be known exactly which device obtains which version of database information. In addition, the databases are encrypted when stored on the device and cannot be accessed without proper authorization. Remote Verification and Authentication (1:1 Remote and Document Authentication)

This embodiment addresses a solution for a situation when the operator is verifying a new Schengen Visa or other government/agency issued credential, however the biometric data is not stored in the credential itself, but rather in a central database. In this scenario, the operator preferably should be able to submit the individual's captured finger print to the central AFIS where it will be compared with the stored fingerprint that is associated with the Schengen Visa number, or other government/agency issued credential number.

The operator should be able to run the following scenarios using this function, including but not limited to:
1. Read the Visa or other credential number using the MRZ reader on the device.
2. Capture the FP using the device and submit it to the appropriate central AFIS database along with the Visa or other credential number. Once the verification is completed in the central AFIS the result will be returned to the device as a match or no-match. In the event of a no-match the operator will be able to use the already captured information to perform any of the other functions described previously.

There has thus been outlined, rather broadly, the more important features of a device for the authentication and verification of individuals and/or documents, wherein the device includes a multifunctional authentication service and is disposed to be in data communication with a plurality of remote databases; furthermore a secure information exchange device located within the device itself provides for the secure pairing and operation of the device and a data transfer medium to allow for the transfer of a subject's information to a plurality of databases in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

DETAILED DESCRIPTION OF THE PREFERRED EMBODIMENTS

The instant invention discloses an intelligent peripheral device possessing a secure multifunctional authentication service integrated with data storage capability, wherein the device is disposed to comprise a multifunctional intelligent peripheral or accessory device, which, upon implementation into a system, is disposed to control a set of transactions that the system is designated to perform by the device, in conjunction with a data transfer medium which is under the control of the device.

The instant invention is disposed to perform the authentication and verification of individuals and/or documents, wherein the device includes a plurality of data storage capability, and is disposed to be in data communication with a plurality of remote databases through a data transfer medium. Furthermore, each accessory device is disposed to possess a secure multifunctional authentication service.

Therefore, in one embodiment, the instant invention is disposed to function as a device to enable the authentication of both a subject and their associated issued credentials, as well as a validation that the individual presenting the issued credentials is the actual holder. The device is disposed to enable this operation to occur using any data transfer medium to allow for communication with a plurality of remote databases. The authentication of a subject may occur through the use of a biometric data search and a demographic data search and match capability, either alone or in combination.

The instant invention is further disposed to enable an encrypted wireless connection between the device and any data transfer medium, for the secure transfer of information from the device to and from a plurality of remote databases. This function may be accomplished through hardware and software embedded with the device, in combination with a data transfer medium.

In one embodiment of the instant invention, wherein the device and a data transfer medium are in wireless communication, the communication may be of any protocol and technology. Additionally, the encryption protection may be provided as an autonomous layer to the actual communications protocol or technology utilized with the instant invention.

In yet another embodiment of the instant invention, an operator is provided with the ability to manage the pairing of a device and a data transfer medium, in combination with the issuance of these paired sets to the operator. In addition, the operator is provided with the ability to manage and control any data that is downloaded to the device from a central or remote database.

Figure 1:
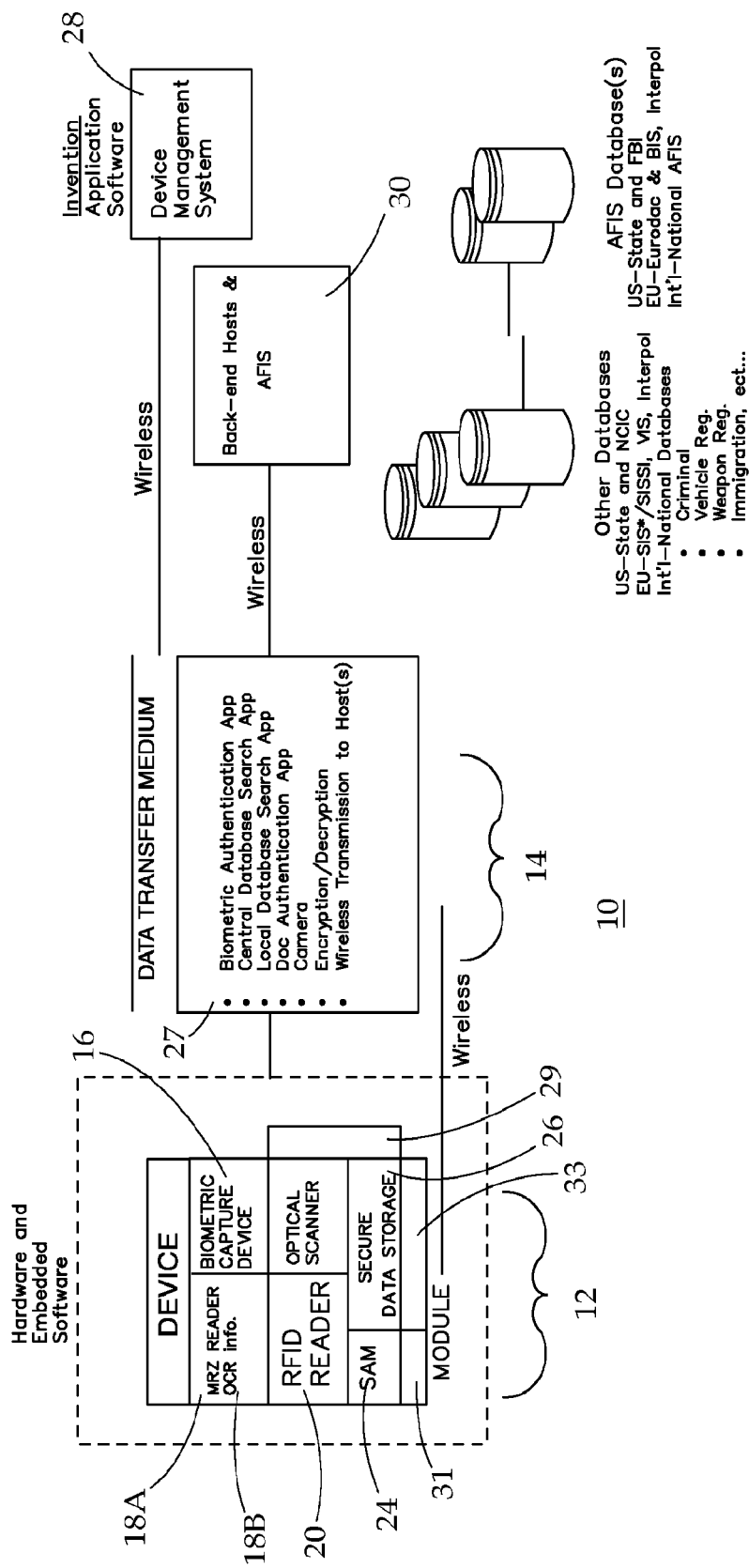
FIG. 1 is a block diagram illustrating a device for the authentication and verification of individuals and documents, wherein the device possesses a secure multifunctional authentication service and is in data communication with a plurality of remote databases.

FIG. 1 illustrates a block diagram of the instant invention 10, wherein a device 12 is disposed to be in data communication with a data transfer medium 14. In one embodiment, the data transfer medium 14 may be a mobile device, a portable communications device, a computing platform device or a Bluetooth® connection. In one embodiment, the device 12 comprises a biometric authentication module 16, wherein the authentication module is disposed to preferably capture a subject's fingerprint for the purposes of either identification or verification. Furthermore, the device 12 includes a Machine Readable Zone ("MRZ") Reader 18A and an Optical Character Recognition ("OCR") reader 18B, along with and a Radio Frequency Identification ("RFID") reader 20 disposed to capture and process various documents in possession of a subject preferably for an authentication query. In addition, an optical document scanner 22 is provided for analysis of documents for authentication. The device 12 further includes a secure access module 24, wherein the secure access module is disposed to interface with the data transfer medium 14 for the secure transfer of information between the device and a plurality of remote databases. Furthermore, the device 12 is disposed to possess a plurality of data storage 26 preferably in the form of either a local fingerprint database or a denied person's watch list for example. Furthermore, the device 12 is disposed to possess a camera 27 to allow an operator of the device to secure a visual identification of a subject, a magnetic strip reader 31 and a contact card reader 33.

In one embodiment, the device 12 is in data communication with a device management system 28, through the data transfer medium 14, wherein the form of data communication is preferably a wireless communication. Additionally, the device 12 is disposed to be in data communication with a plurality of databases 30 preferably for remote identification and verification of an individual and/or documents.

As described above, the instant invention is disposed to allow for a plurality of biometric and non-biometric search and match functions to be combined in any way an operator requires thru the specialized configuration capability of the software and accessory device hardware. The four primary biometric functions are the following:

1:N Local Identification
1:N Remote Identification
1:1 Local Verification
1:1 Remote Verification The non-biometric functions are the following (it is important to note that for each function the application enables the interface protocols to be customized to their respective requirements for each country):

Name Search (European Union ("EU")—Schengen Identification System ("SIS") and SISII, United States—State and National Crime Information Center "NCIC")
Vehicle Registration Search (EU—SIS+ and SISII, US—State Department of Motor Vehicles)
Weapon Registration Search (US—State and NCIC)
Drivers License Search (EU—National Db and US—State DMV)
Vehicle VIN Search (EU—SIS+ and SISII, US—State DMV)
Visa Search (EU—VIS/BIS)
Any other issued government or private sector credentials In addition, a special credential authentication function allows the operator to obtain information as to the authenticity of the secure credential they are in possession of, including but not limited to:

E-Passports, and Standard Passports
National IDs
Drivers Licenses
Any other issued government or private sector credentials
Identification with a Limited Device Only Database
(1:Few and Local Search)

This embodiment allows for a watch list fingerprint and DPL or other type of subset databases resident on the device itself. This would allow the operator to identify a subject where communications may be limited such as remote areas or in building where communication signals are not reliable. Also it is used when specific set of subjects are being searched against. The device provides for the means to update these local databases by the operator over a data transfer medium, including but not to limited to a wireless network, office WiFi, USB connection with an office PC, or through an office LAN connection. Furthermore, each device is disposed to be uniquely identifiable so that it can be known exactly which device obtains which database information. In conjunction with the security of each device, the database(s) resident on the device 12 are disposed to be encrypted when stored on the device, and to be automatically deleted if tampered with by an operator without proper authorization.

Identification
(1:N Remote and Central Database Searches)

This embodiment provides the capability to perform searches against designated segments of databases using records transmitted preferably via wireless technology from the device to plurality of remote databases. The 1:N FP function allows operators of the instant invention to capture fingerprints of unknown subjects in the field. Once the fingerprint is captured, it is transmitted to the central AFIS site for searching. A hit/no hit response is returned to the device, and if available, a photo of the individual may also be returned.

Furthermore, a remote database search allows an operator to obtain demographic data of subjects in the field. This search can be conducted in one or several different databases; depending on what the operator initiates and the type of information available from the subject. The operator can selectively conduct search(es) from the databases they are authorized to access and they can select the order in which the databases are searched against.

Verification and Authentication
(1:1 Local and Document Authentication)

This embodiment is disposed to confirm the identity of an individual through biometric verification and document authentication. This requires the use of a smart card/e-passport or other machine-readable imbedded biometric solution. When a subject possesses this form of identification, the operator may verify the identity of the subject with the offered document, and have the option to also verify the authenticity of the document.

As the authentication of the document is done against a database of valid documents issued by the different governments, this database is disposed to reside on the device in a secure format. As with the other databases stored on the device, the device is uniquely identifiable so that it can be known exactly which device obtains which version of database information. In addition, the database is encrypted when stored on the device and be automatically deleted if tampered with out proper authorization.

Remote Verification and Authentication
(1:1 Remote and Document Authentication)

The embodiment is disposed to allow for the verification of a new Schengen Visa or other government/agency issued credential when the biometric data is not stored in the credential itself, but rather stored in a remote database. The operator may submit a subject's captured fingerprint and transmit it to the central AFIS where it will be compared with the stored fingerprint that is associated with the Schengen Visa number or other government/agency issued credential number. The instant invention will also authenticate the Visa or credential using the device and the authentication application.

Figure 2:
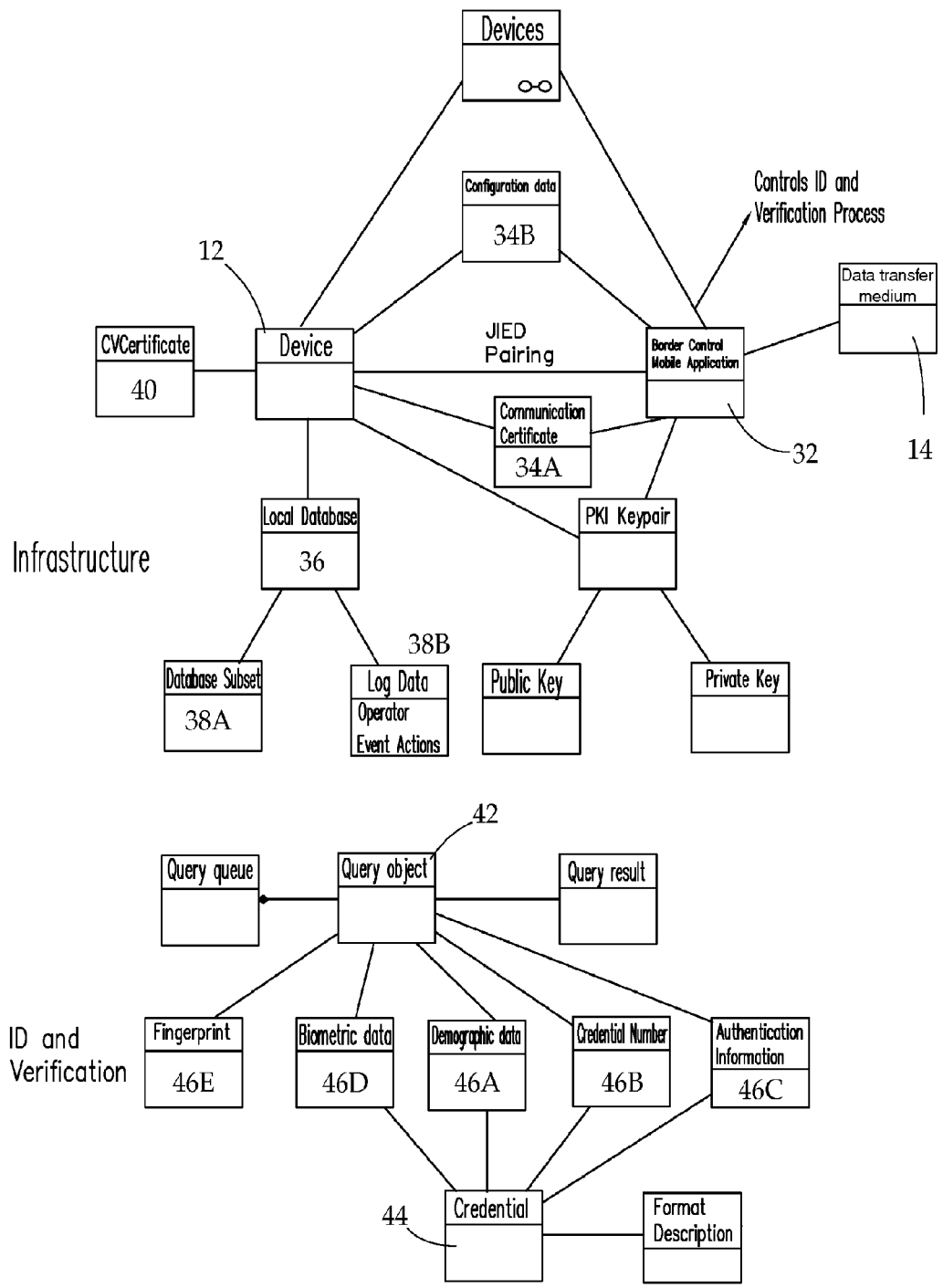
FIG. 2 is a block diagram illustrating both the objects which form the infrastructure of the instant invention, and the objects utilized for identification and verification during use of the instant invention.

FIG. 2 illustrates a block diagram of both the objects which form the infrastructure of the instant invention, and the objects utilized for identification and verification during use of the instant invention. The objects are separated into two groups; at the top of the diagram the infrastructure objects shown, and objects at the bottom of the diagram are used by identification and verification.

Infrastructure Objects

As previously mentioned, the instant invention includes the device 12 for the authentication and verification of individuals and/or documents, wherein the device 12 is in data communication with a plurality of remote databases 30 through the data transfer medium 14. Furthermore, in one embodiment a Border Control Mobile Application ("BCMA") 32 may be installed on the device 12, wherein the BCMA 32 allows for the control of the identification and verification processes. Furthermore, the BMCA 32 is in data communication with the device 12 preferably via Bluetooth®, and a plurality of National State Host Machines preferably via a cell phone network.

In one embodiment, the BCMA 32 and the device 12 comprise a device object after a pairing process (described in a later section). During the pairing process a plurality of communication certificates 34A and configuration data 34B are uploaded to the respective devices; in one embodiment the communication certificates 34A are in an X.509 format. A plurality of local databases 36 is disposed to be stored on the device 12, wherein this database 36 may include a plurality of database subsets 38A, including but not limited to "Hotlists", and a plurality of log data 38B, including but not limited to an operator's action log and an event log. A card verifiable ("CV") certificate 40 may be optionally stored on the device 12 and is disposed to be used when reading the RFID chip.

Identification and Verification Objects

A query object 42 is disposed to conduct a plurality of searches against the local 36 and remote databases 30. The query object 42 collects all of the necessary data in the identification/verification processes; the amount and type of data to be collected depends on the process. A credential 44 is disposed to store a plurality of demographic data 46A and a credential number 46B. Furthermore, the credential 44 possesses a plurality of authentication information 46C, including but not limited to watermarks and other verifiable properties, along with a plurality of biometric data 46D and a reference fingerprint of the operator 46E. In one embodiment, in order for an operator to authenticate the credential 44, the BCMA 32 is disposed to use a format description which describes the authentication information that can be found on a credential 44, along with a way for how the information may be read.

Figure 3:
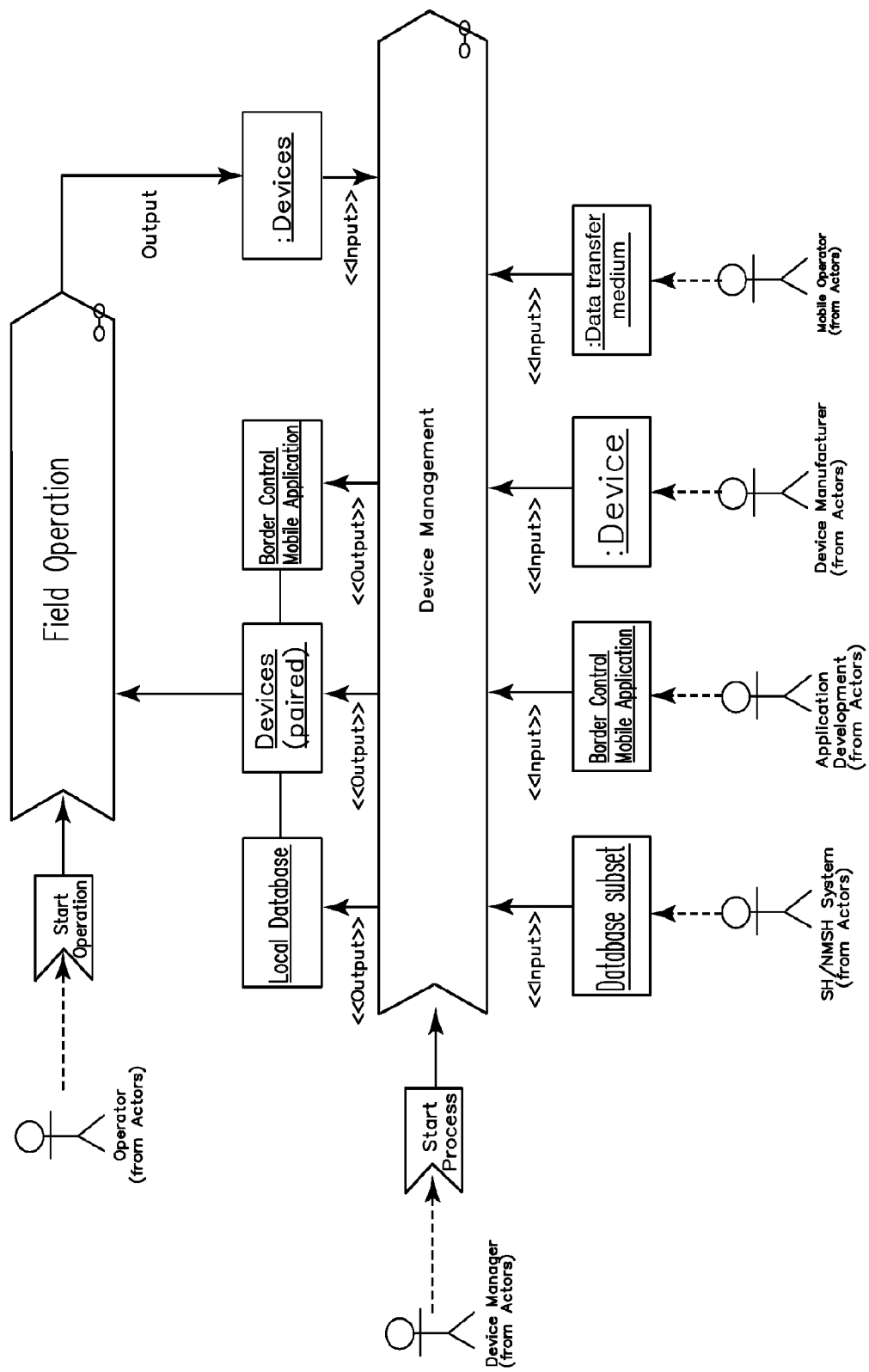
FIG. 3 is a flow diagram illustrating one embodiment of the operation of the instant invention by an operator and operation of the instant invention by a device manager.

FIG. 3 illustrates one embodiment of the operation of the instant invention by an operator and operation of the instant invention by a device manager. The workflow has two parallel braches (1) device management; and (2) field operations, which will be described in more detail in the below sections.

Figure 4A:
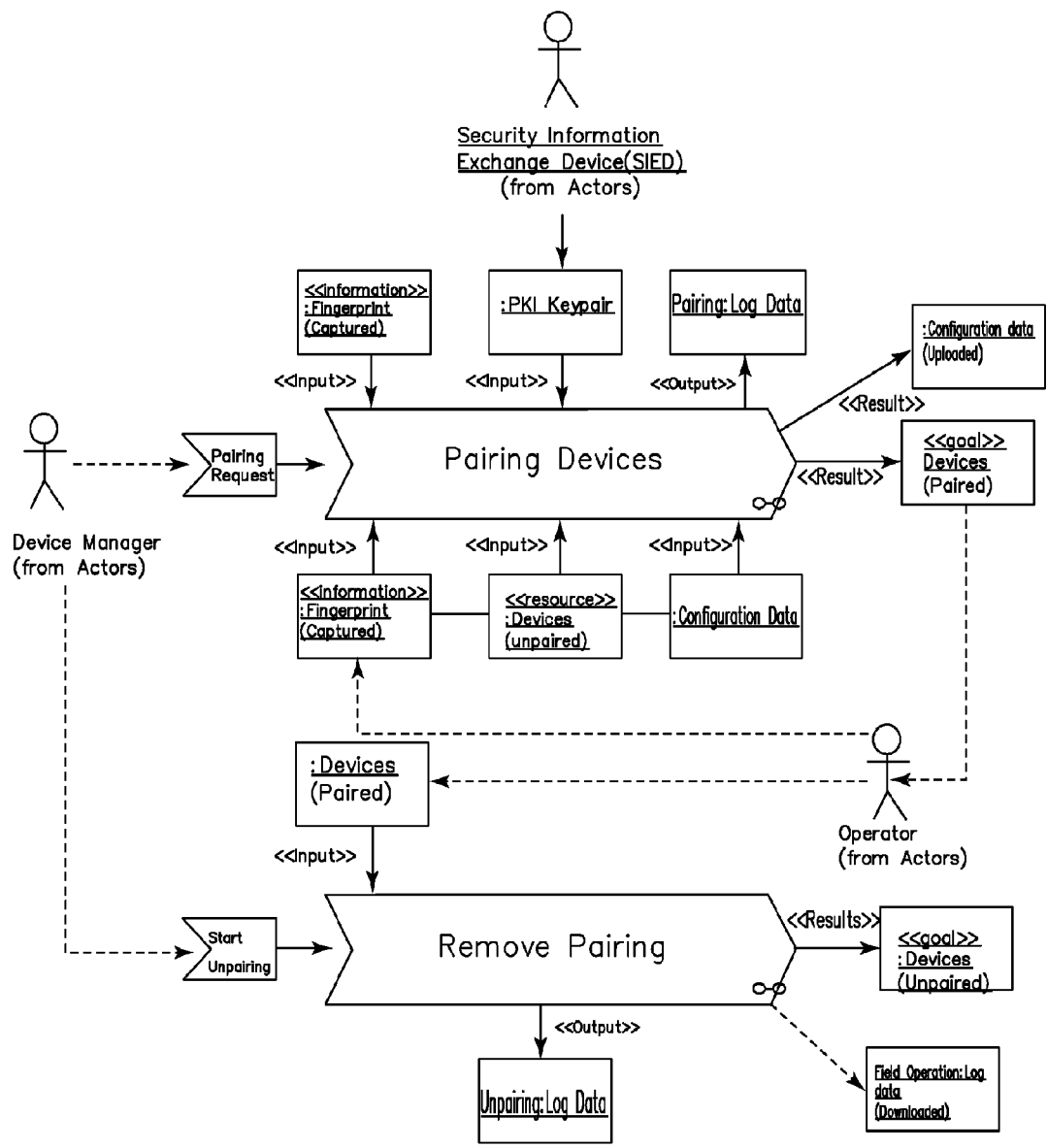
FIGS. 4A and 4B are a pair of flow diagrams illustrating device management of the instant invention.
Figure 4B:
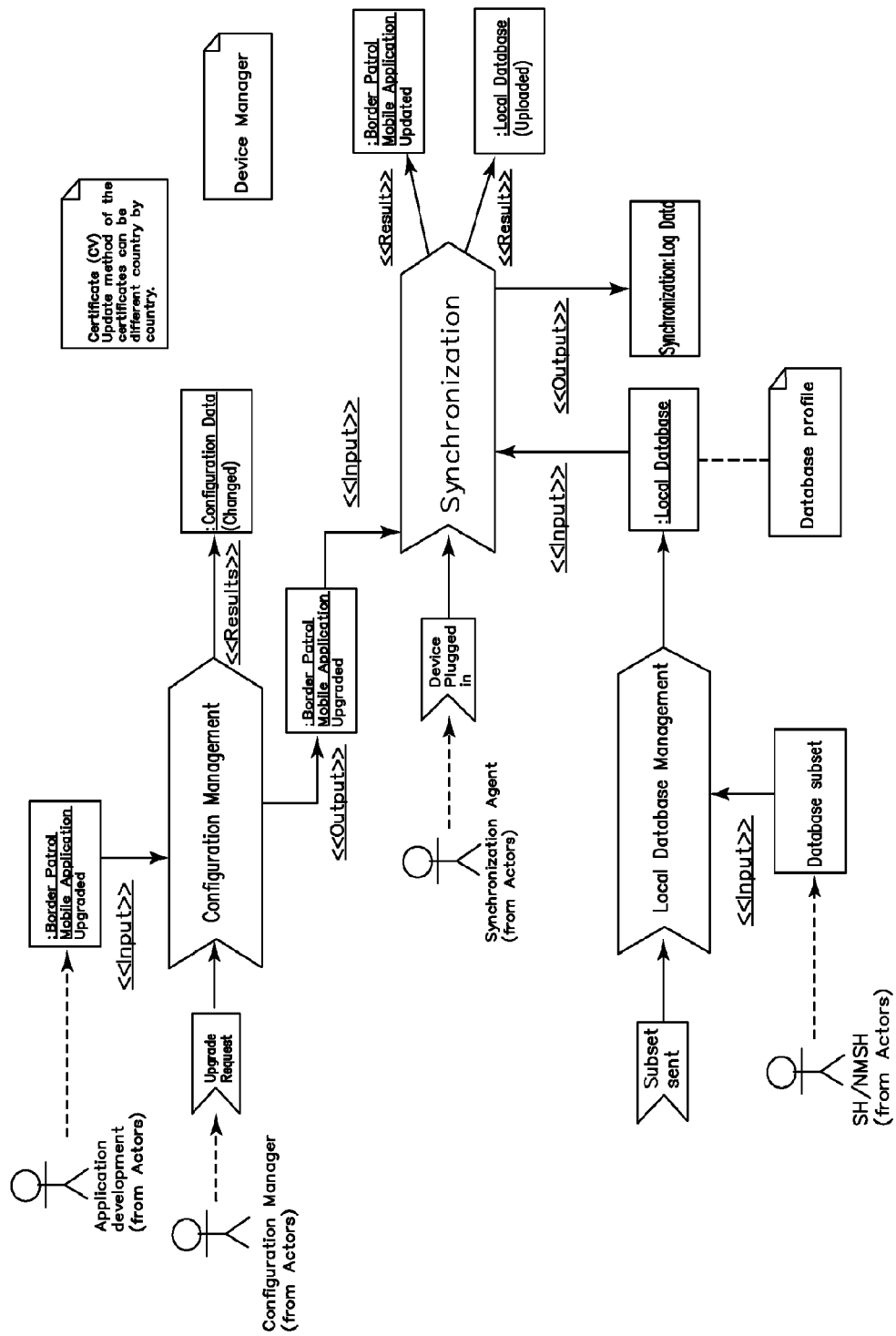

FIGS. 4A and 4B illustrate a flow diagram for operation of the device management system 28 of the instant invention, wherein the management system 28 of the device 12 is disposed to receive the device 12, the data transfer medium 14 along with the plurality of database subsets 26. Furthermore, the device management system 28 is responsible for the storage of applications, database subsets and device information into its own database.

In addition, the device management system 28 is disposed to create a plurality of database profiles (hotlists), configuration data, and subsequently update applications and database profiles on the device 12. Lastly, the device management system 28 is disposed to pair the device with an available data transfer medium 14 and hand the device to the operator, and subsequently remove the pairing of devices, and download a filed operation log from the devices.

Figure 5A:
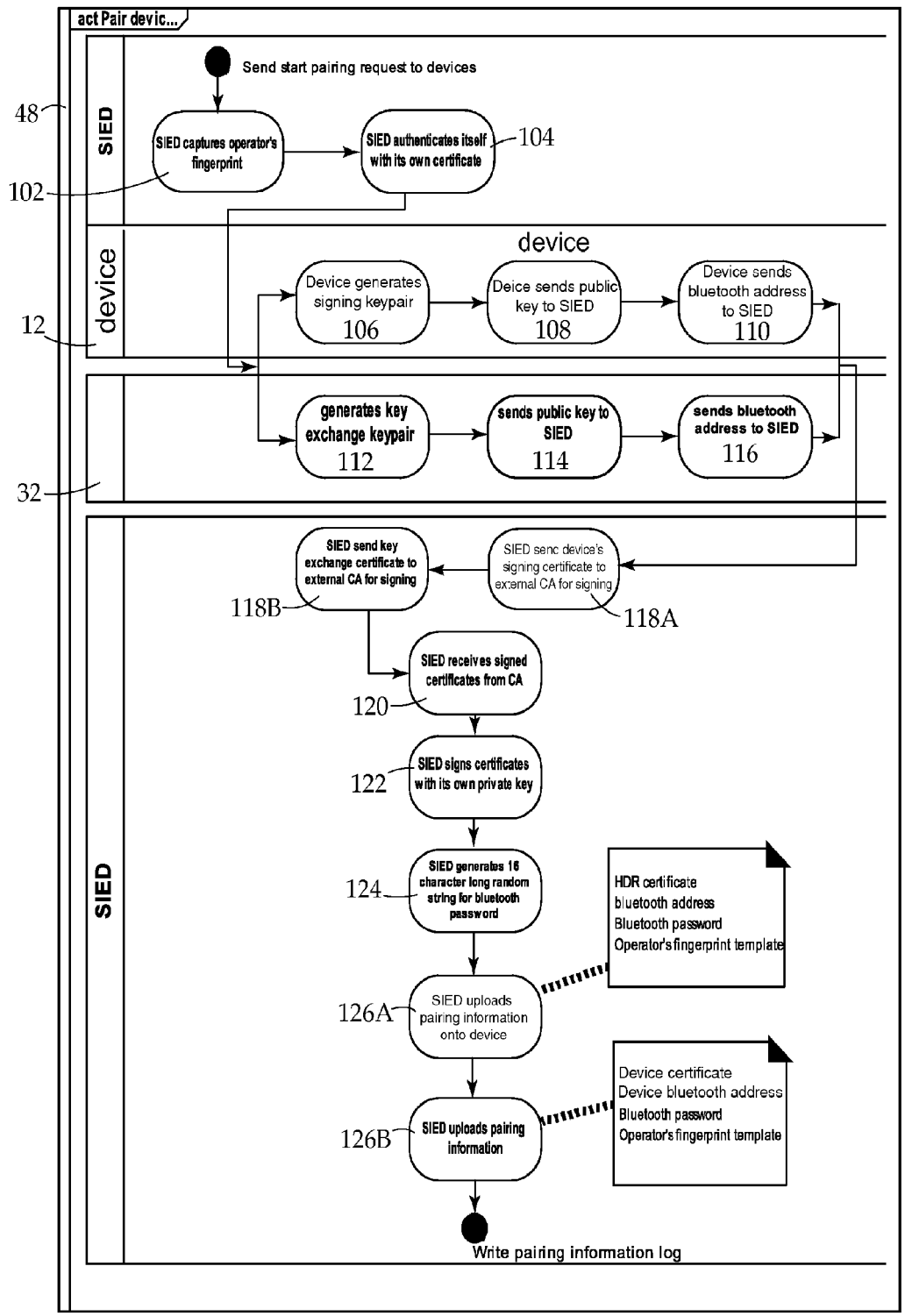
FIG. 5A is a flow diagram illustrating a method for device pairing of the instant invention, preferably between a device and a data transfer medium.

FIG. 5A illustrates a method for device pairing of the instant invention, preferably between the device 12 and a data transfer medium 14 to allow for the secure transfer of information between the device 12 and a plurality of remote databases 30. In one embodiment, the pairing and removing may be performed by a device manager. Initially, in order commence a pairing operation, the device 12 includes a secure information exchange device ("SIED") 48, wherein the SIED 48 is disposed to authenticate the device 12 and is in data communication with the data transfer medium 14. In order to authenticate the device 12 and the data transfer medium 14, the SIED 48 is disposed to read and/or analyze a plurality of authentication data, including but not limited to the identification information and certificates of the device 12 and the data transfer medium 14. During authentication, the SIED 48 compares the digital certificate of the device 12 and the data transfer medium 14 against an external certificate authority ("CA") root certificate. In one embodiment, the device 12, and the data transfer medium 14, in combination with the SIED 48, all possess digital certificates issued by the same CA, and therefore are all on the same certification chain. Therefore, when the verification of the digital certificates is successful, the SIED 48 performs a search in a device database 50, and when the device 12 and the data transfer medium 14 are enrolled in the device database 50 the authentication of each is approved. Alternatively, if they are not present in the database 50, the SIED 48 warns the device manager. Therefore, upon authentication, the SIED 48 pairs the device 12 with the data transfer medium 14 to allow the device 12 to transmit and receive a plurality of information from the remote databases 30.

Initially at step 100, a request for pairing is transmitted to the device 12 and the data transfer medium 14. At step 102, the SIED 48 is disposed to capture a fingerprint of an operator of the device 12 for an authentication query, and to authenticate the operator when there is a reconnect of the device 12 with the data transfer medium 14. At step 104, the SIED 48 transmits its own digital certificate to both the device 12 and the data transfer medium 14. Furthermore, the device 12 and the data transfer medium may authenticate the SIED certificate against the root certificate of the external CA. Following verification of the SIED 48, at step 106, the device 12 generates a key pair and at step 108, the device 12 transmits a public key to the SIED 48. The public key is utilized during the communication between the device 12 and the data transfer medium 14, wherein the device 12 will authenticate itself with the data transfer medium 14. At step 110, the device 12 will transmit a Bluetooth® address to the SIED 48. Concurrently with the steps performed by the device 12, following the successful verification of the SIED 48 digital certificate by the data transfer medium 32, at step 112, the data transfer medium 14 is disposed to generate its own key pair, and at step 114 transmits the public key to the SIED 48. Again, as described above, this key will be used during the communication between the device 14 and the data transfer medium 14, wherein the data transfer medium 14 will authenticate itself. At step 116, the data transfer medium 14 transmits the Bluetooth® address of the data transfer medium 14 to the SIED 48. At steps 118A and 118B, the SIED 48 transmits the public keys of the device 12 and the data transfer medium 14 to the external CA to signature. At step 120, the SIED 48 receives the signed certificates from the external CA, and at step 122 the SIED 48 signs each certificate with the private key of the SIED 48. Next, at step 124, the SIED 48 is disposed to preferably generate a sixteen character long random string to be utilized as a Bluetooth® password by the device 12 and the data transfer medium 14. Lastly, at steps 126A and 126B the SIED 48 uploads the pairing information for each the device 12 and the data transfer medium 14, wherein the pairing information, includes but is not limited to each certificate, each Bluetooth® address and password and the captured fingerprint of the operator.

FIGS. 5B through 5H display flow diagrams illustrating the various steps in the device pairing process shown in FIG. 5A with alternate embodiments between the device 12 and the data transfer medium 14 through the SIED 48 located in the device 12.

In this embodiment, prior the commencement of a field operation by an operator 52 of the system, the operator will pair the device 12 to a data transfer medium 14. As described above, the process of pairing prior to use is necessary to ensure a certified link between the device 12, and its operator 52, and the data transfer medium 14. The pairing process provides essential information to the device 12 and the data transfer medium 14 in order to be able to build up a secure Bluetooth® communication, along with providing for a secure authentication and authorization. Furthermore, the confidentiality of the local database which is stored on the secure access module on the device 12 also incorporates the above process.

In this embodiment, the pairing and removing of pairing is performed by a device manager. The device manager is disposed to manage the device pairing by preferably registering the device 12, the data transfer medium 14, the local database 26 and the Operator 52 together.

Figure 5B:
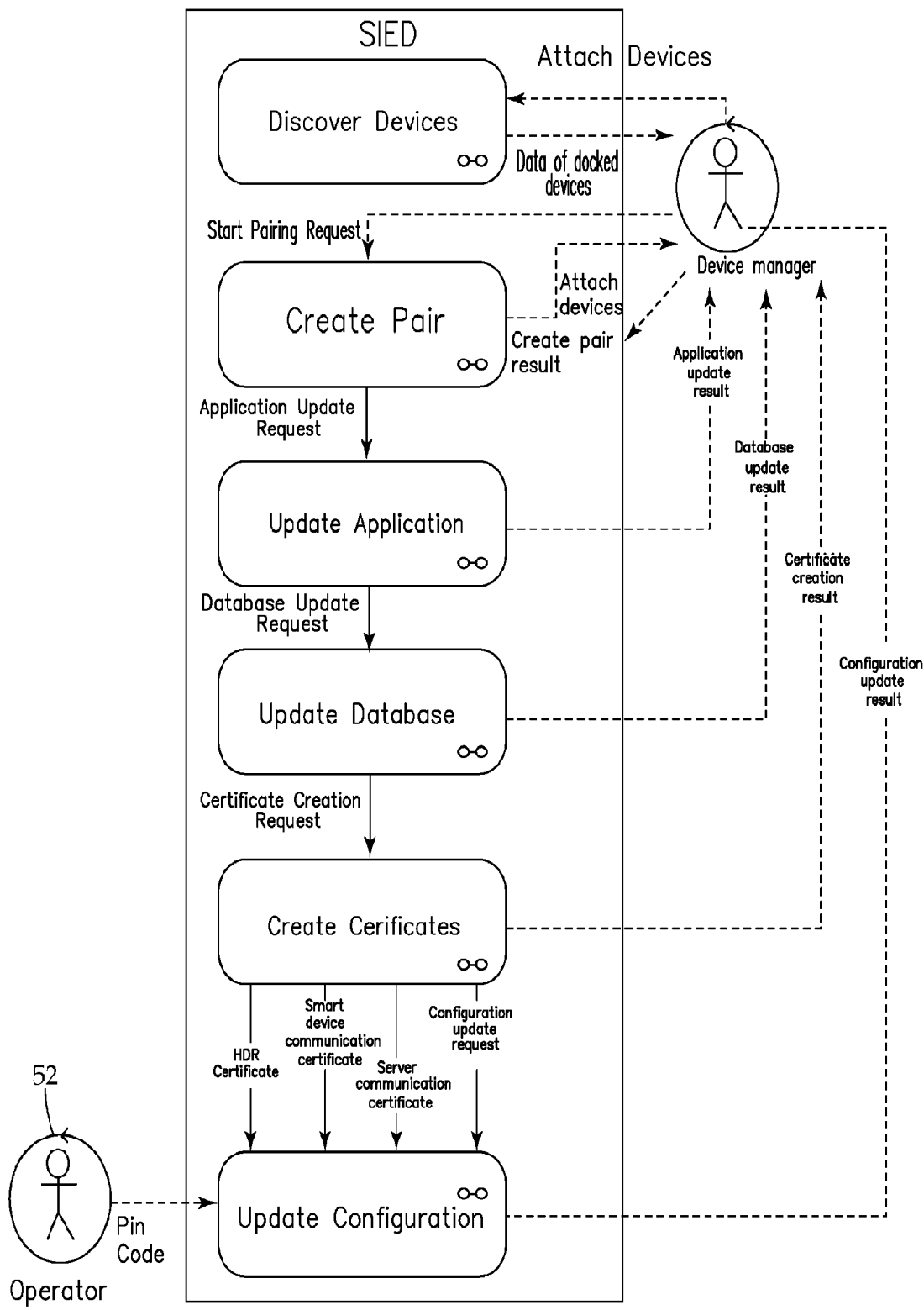
FIGS. 5B through 5H display flow diagrams illustrating the various steps in the device pairing process between the device and a data transfer medium.
Figure 5C:
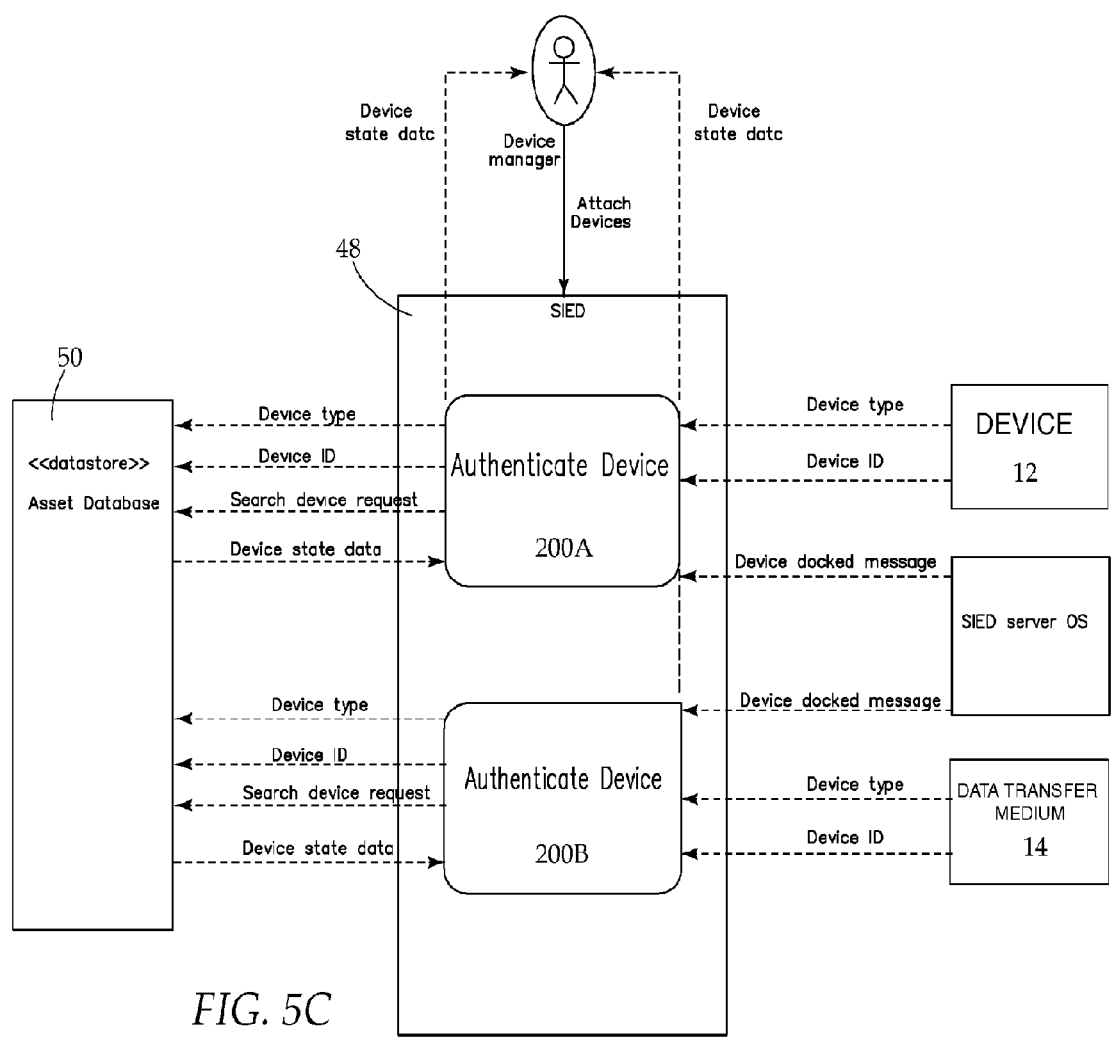
Figure 5D:
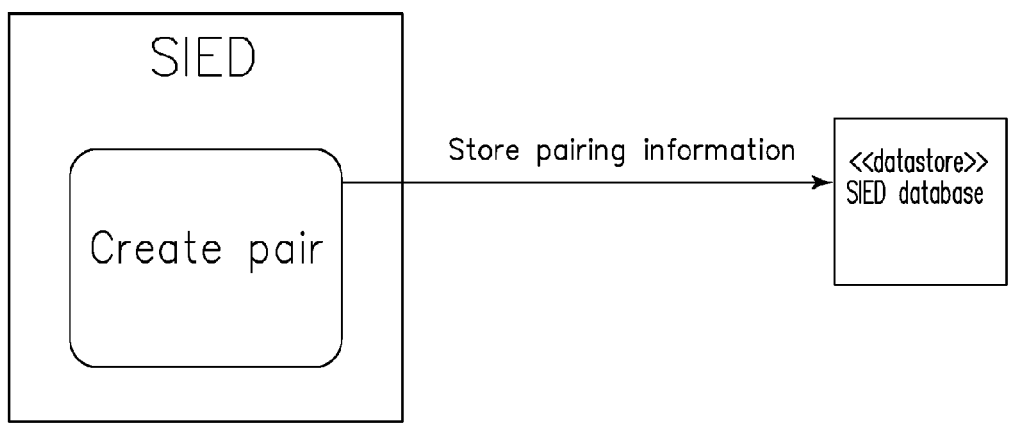
Figure 5E:
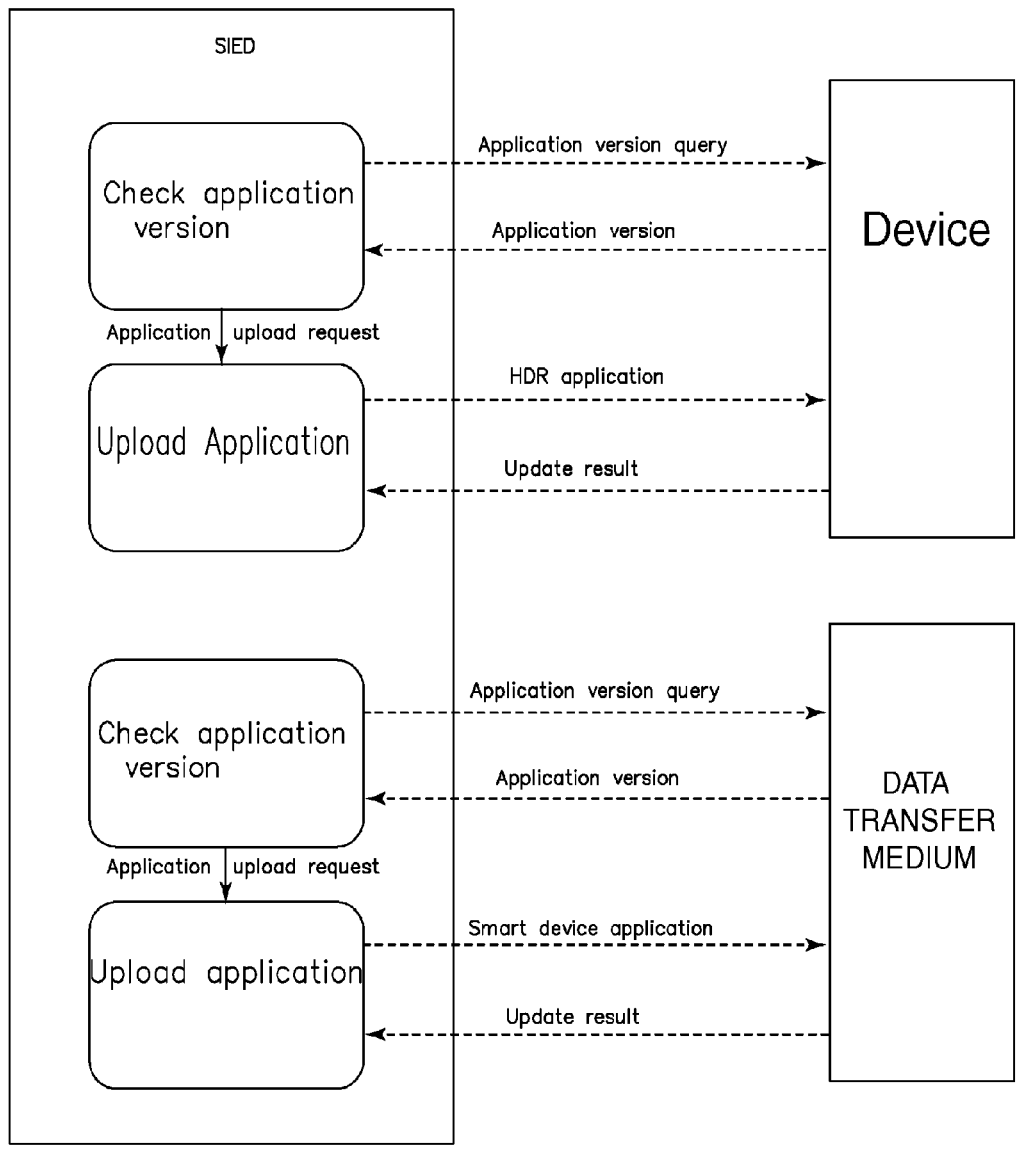
Figure 5F:
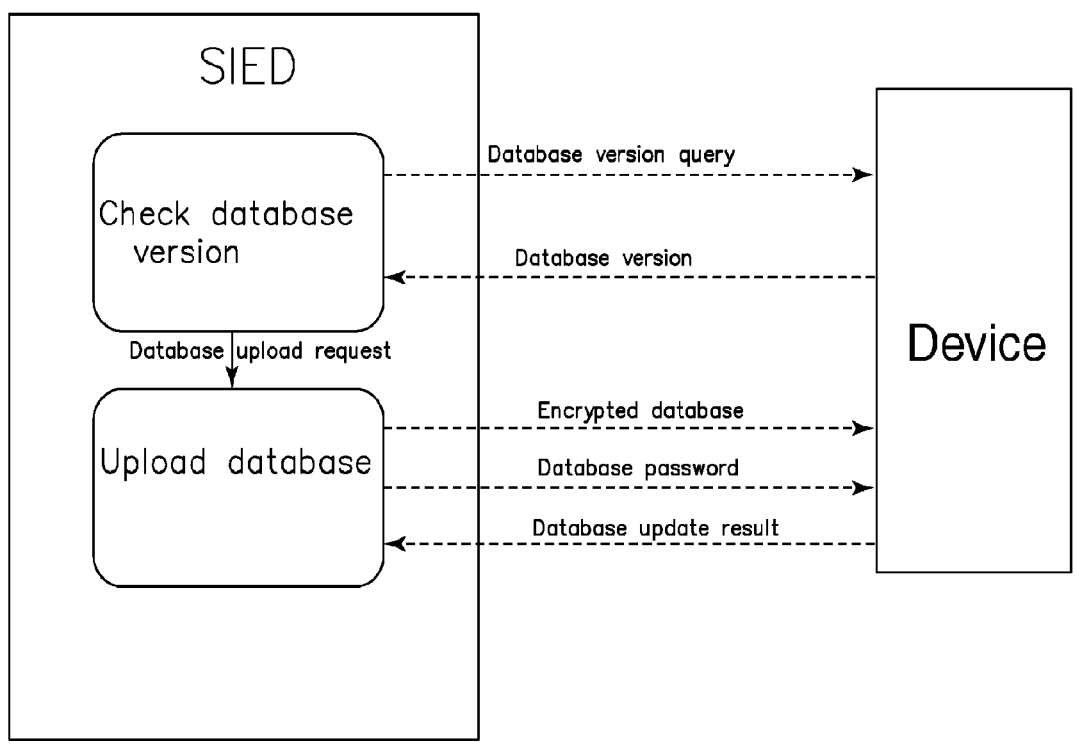
Figure 5G:
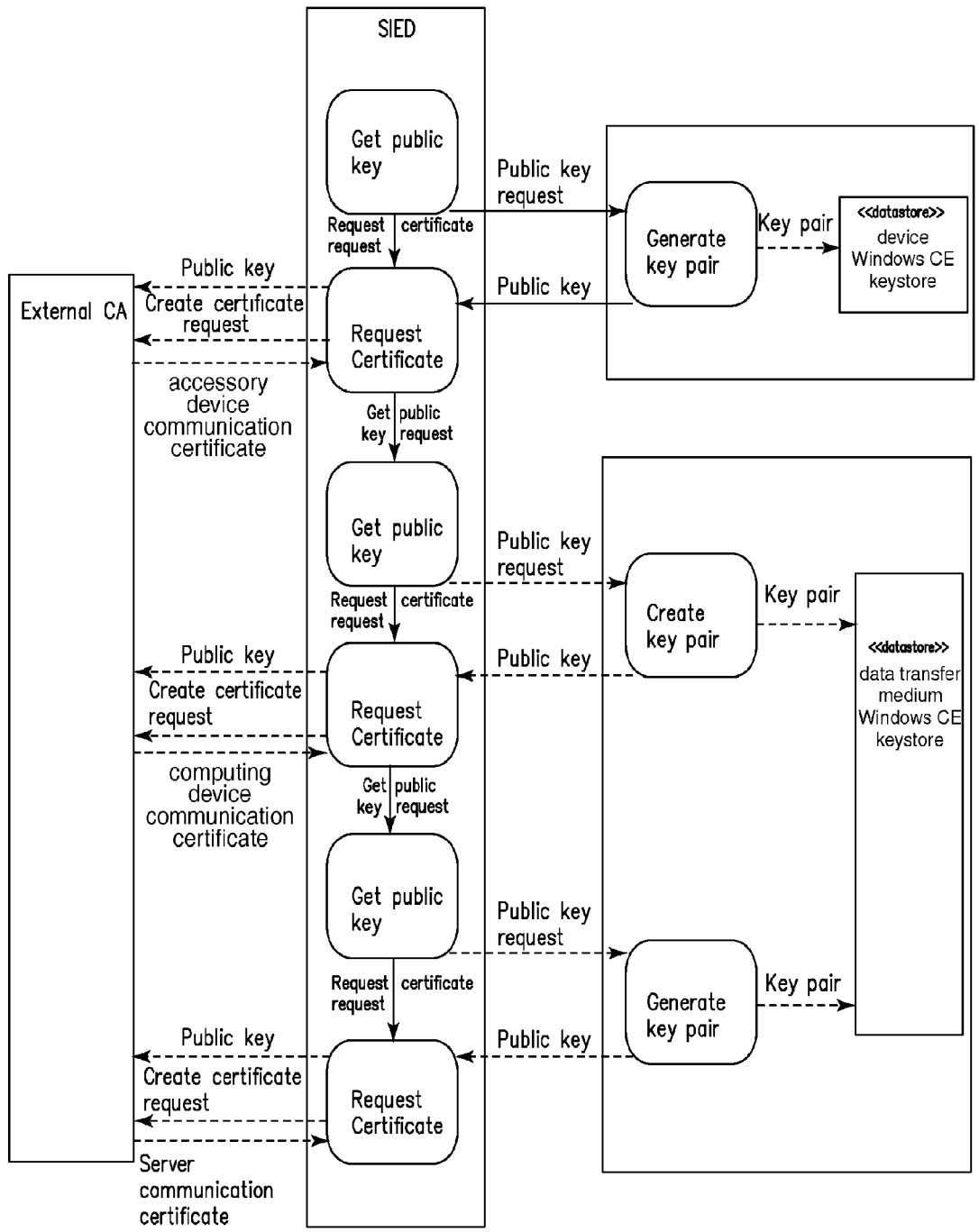
Figure 5H:
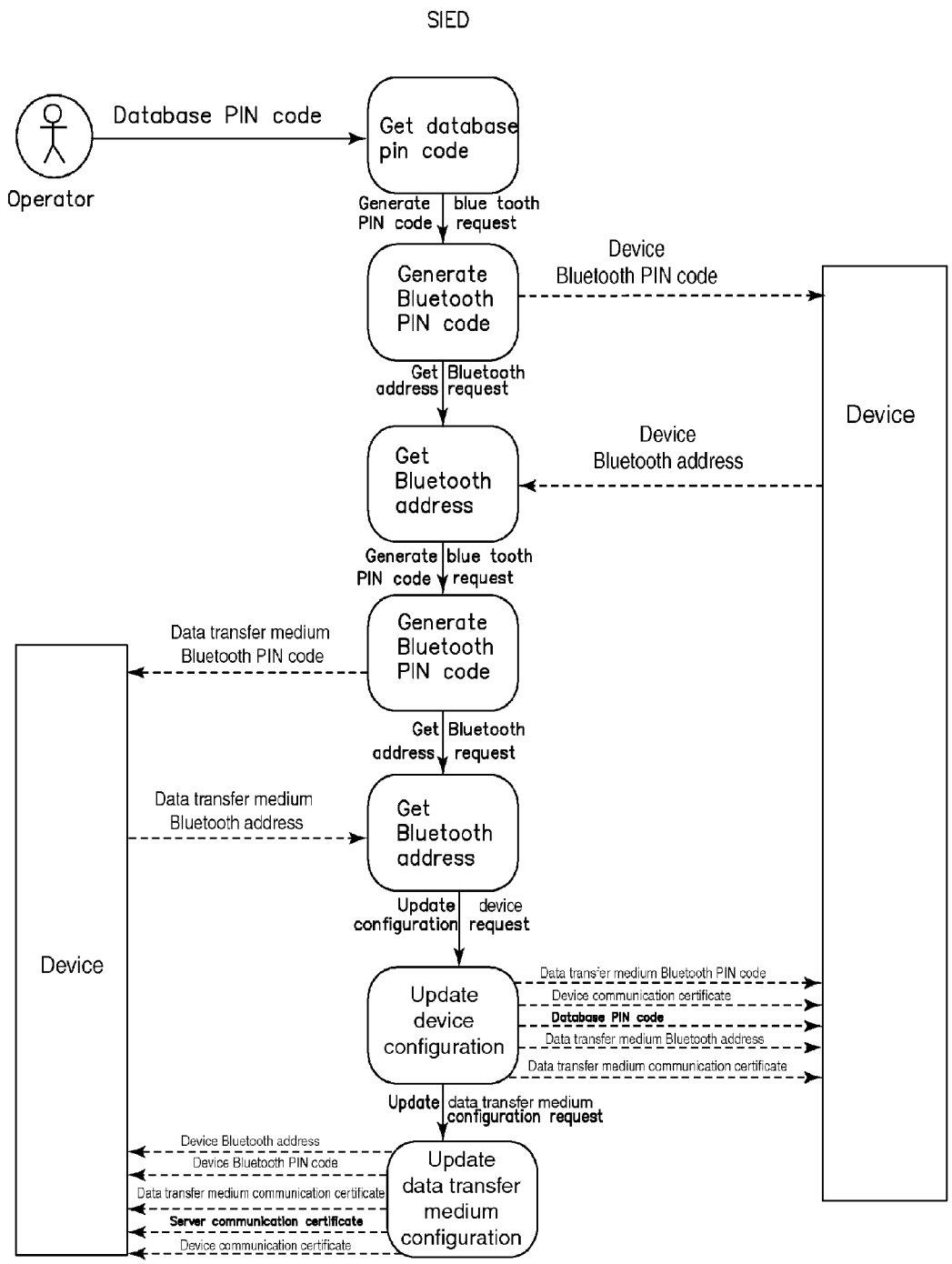

FIG. 5B illustrates the overall pairing process, wherein FIGS. 5C through 5H illustrate in more detail the individual steps which comprise the overall process.

FIG. 5C-5H illustrates one embodiment of the process to perform the following operations:
- Discover devices
- Create a pair of devices
- Update a software application
- Update a database
- Create a certificate for each device
- Update a configuration Initially, the pairing process commences with the discovery of each the device 12 and the data transfer medium 14 that will form a pair. The device 12 and the corresponding data transfer medium 14 are in data communication with the SIED 48. As mentioned above, the SIED 48 acts as a trusted host, wherein each element of the operation (device 12 and the data transfer medium 14) trust on the SIED's 48 genuineness. The SIED 48 is disposed to execute a software application which is provided together with the device 12. At step 200A and step 200B, the SIED 48 authenticates the device 12 and the data transfer medium 14 respectively. The SIED 48 is disposed to read a plurality of authentication data (including Device IDs, certificates) from the device 12 and the data transfer medium 14. Subsequently, the SIED 48 checks each of the digital certificates against the external CA's root certificate. If the verification of the digital certificates is successful, then the SIED 48 searches the device IDs in the device database 50. If the device 12 and the data transfer medium 14 are enrolled in the device database 50, then the authentication is successful. In any other case, the SIED 48 will alert the device; in this embodiment, registration of the device 12 and the data transfer medium 14 will occur prior to the commencement of the pairing process.

Following completion of the authentication of the devices, the SIED 48 is disposed to perform the pairing by first capturing a fingerprint of the operator 52; preferably the fingerprint will be utilized to authenticate the operator when there is a connect-reconnect of the device 12 and the data transfer medium 14. Next the SIED 48 sends its own digital certificate to both the device 12 and to the data transfer medium 14; the device 12 and the data transfer medium 14 are disposed to authenticate the SIED certificate against the root certificate of the external CA. In this embodiment, the device database 50 is not a part of device 12 itself, rather it is preferred that the operator 52 or device manage possesses an inventory database. Interfacing of the device database is a part of the device 12 integration. The enrolment of the devices shall be made by the end user, by using the registration software of their inventory database.

If the SIED digital certificate is successfully verified by the device 12, the device generates a key pair (i.e. public and private) and forwards the public key to the SIED 48. This public key will be utilized during the communication between the device 12 and the data transfer medium 14, wherein the device 12 will authenticate itself to the data transfer medium 32. Finally, the device 12 will transmit the Bluetooth® address of the device 12 to the SIED 48.

Similar to the verification of the device 12, if the SIED digital certificate is successfully verified by the data transfer medium 14, the data transfer medium 14 generates a key pair and transmits the public key to the SIED 48. This key will be utilized during the communication between the device 12 and the data transfer medium 14, wherein the data transfer medium 14 will authenticate itself to the device 12. Finally, the data transfer medium 14 will transmit its Bluetooth® address to the SIED 48.

As described in FIG. 5A, the SIED 48 sends the public keys to the external CA for signature. Then the SIED 48 generates a sixteen character long ID which will be used as a Bluetooth® password by the device 12 and the data transfer medium 14. The SIED 48 will then upload the device 12 certificate, the data transfer medium 14 certificate, the data transfer medium 14 Bluetooth® address, and the Bluetooth® password to the device 12. Once a successful pairing occurs, the pairing will be stored a database of the SIED 48. Following the pairing of the devices, a synchronization agent will update the hotlists and software application if necessary.

Figure 6:
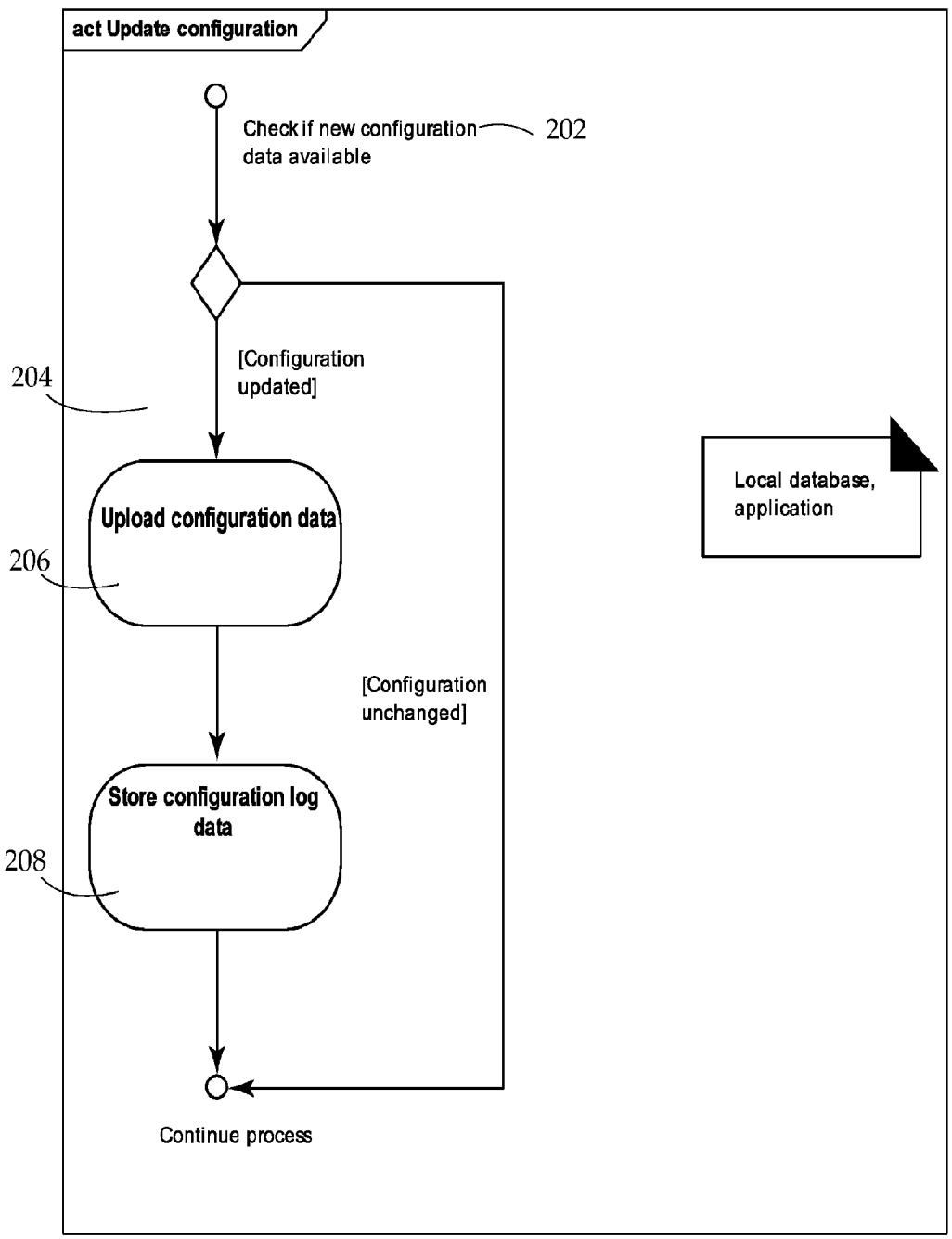
FIG. 6 is a flow diagram illustrating a method for configuration management of the instant invention.
Figure 7:
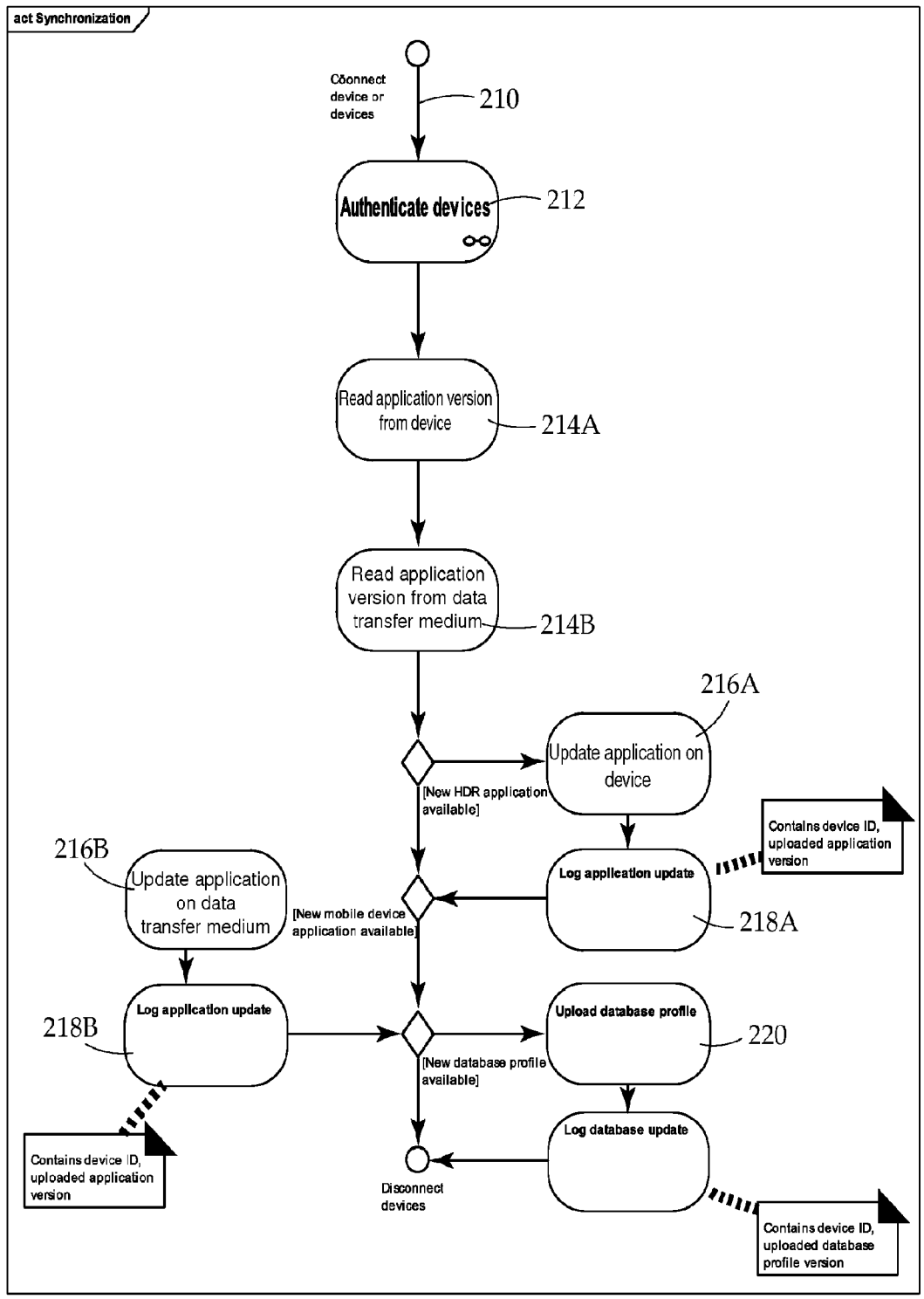
FIG. 7 is a flow diagram illustrating synchronization of the instant invention.

FIG. 6 illustrates a flow diagram for configuration management of the overall system, wherein a configuration manager is responsible for the process to create a plurality of configuration data, and to define which application upgrades require installation on the device 12 at the synchronization process (see FIG. 7). In one embodiment, the configuration data may be uploaded during the pairing process. At step 202, the configuration manager performs a query to determine if new configuration data is available. At step 204, if new configuration data is available, the configuration data is updated, and at step 206, the configuration data is subsequently uploaded. Then at step 208, the new configuration data is stored in the log data on the local database of the device 12.

FIG. 7 illustrates a flow diagram for synchronization of the instant invention, wherein at step 210, either device 12 or the data transfer medium 14 is disposed to be in connection with the SIED 48. At step 212, the configuration manager authenticates the attached device as previously described in FIG. 5A. At step 214A, the application version of the device 12 is checked to determine whether an upgrade is available; at step 214B, the application version of the data transfer medium 14 is checked to determine whether an update is available. When an application upgrade is available for the device 12, at step 216A the new application is uploaded, and at step 218A, the application data is logged. When an application upgrade is available for the data transfer medium 14, at step 216B the new application is uploaded, and at step 218B, the application data is logged. Lastly, the SIED 48 is disposed to check the database profile, and if the profile has changed, the SIED 48 will update the database at step 220.

Figure 8A:
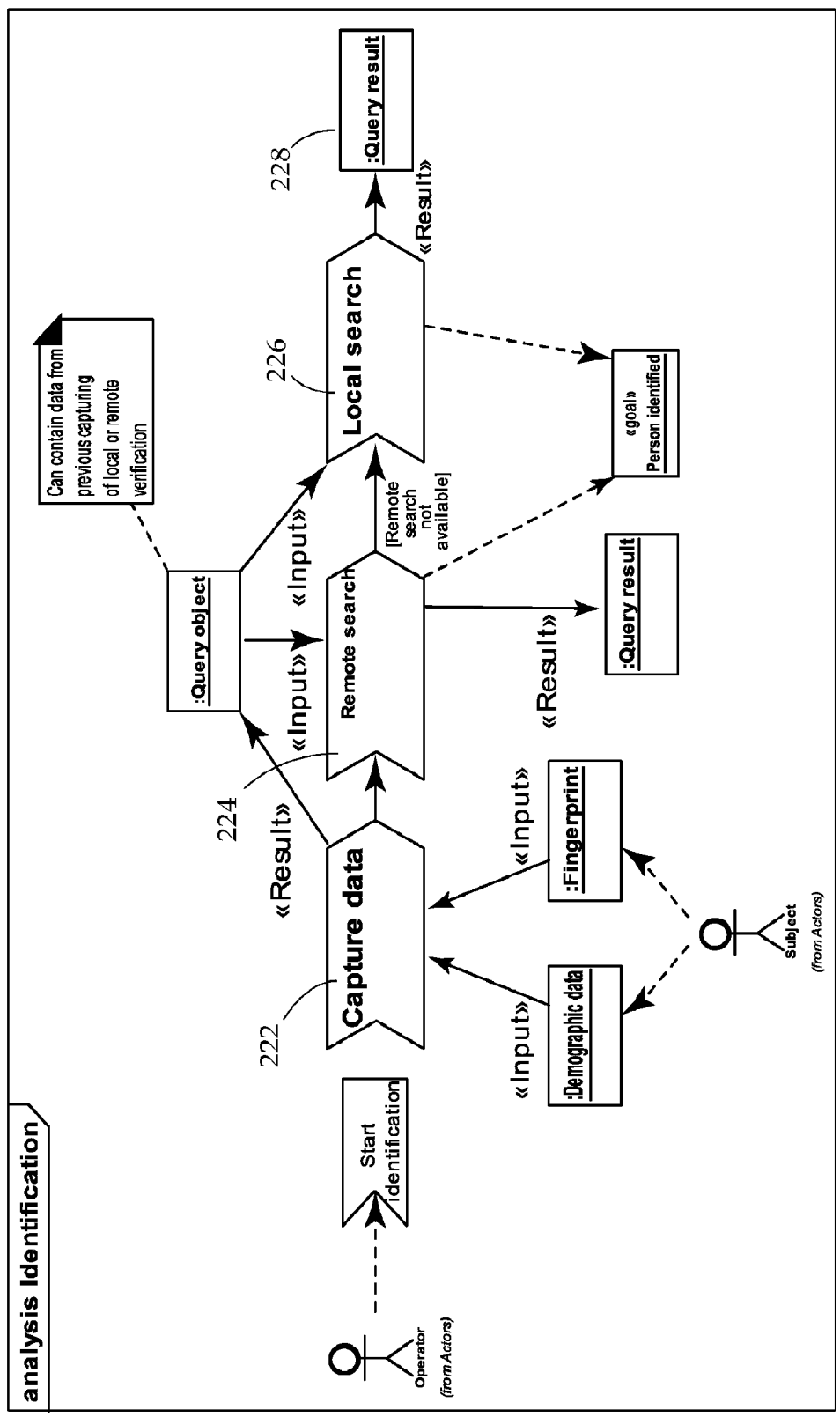
FIG. 8A is a flow diagram illustrating field operations by an operator of the instant invention during an identification query.
Figure 8B:
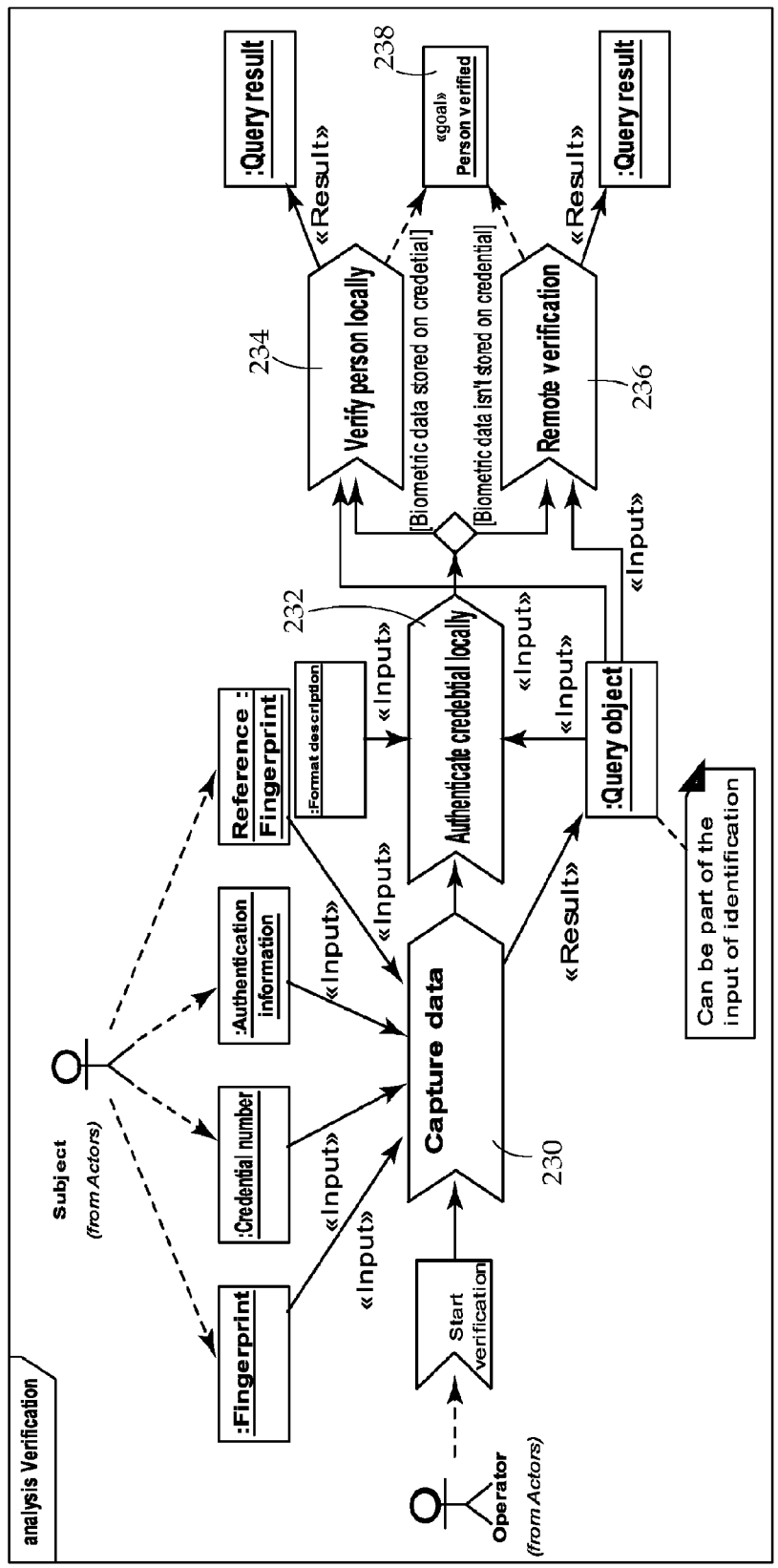
FIG. 8B is a flow diagram illustrating field operations by an operator of the instant invention during a verification query.
Figure 8C:
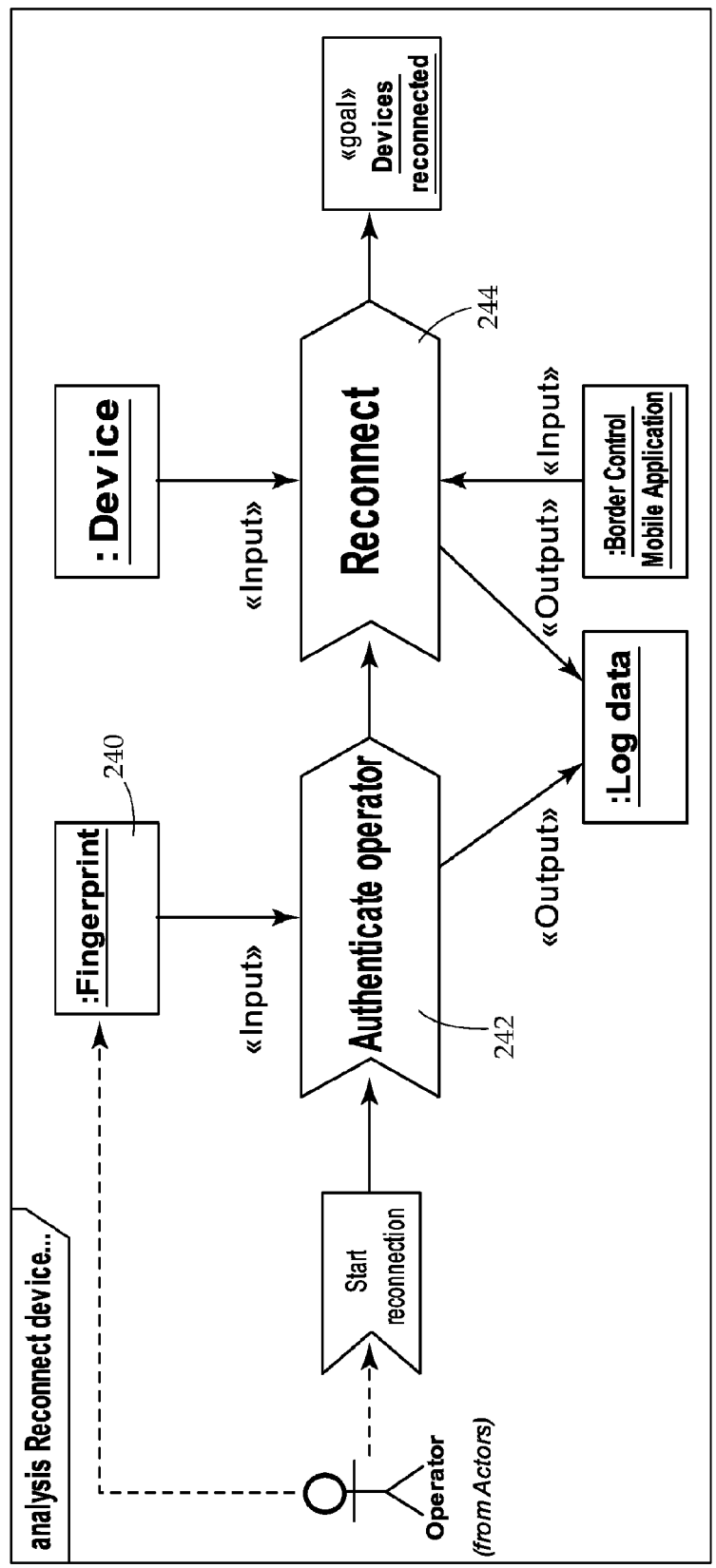
FIG. 8C is a flow diagram illustrating field operations by an operator of the instant invention during a reconnect between devices.

FIGS. 8A through 8C illustrate a variety of field operation processes that may be performed by an operator, wherein the process include, but are not limited to: Identification; Verification; and Reconnect of devices.

The identification and the verification processes may include either a local or remote database search depending on a particular situation and need of an operator. In one embodiment, a remote search is performed on a remote database, wherein the device 12 is disposed to transmit a search query to a National State Host Machine ("NSHM") preferably via a cell phone network; the data communication between the NSHM and the device 12 is preferably secured by using a Transport Layer Security ("TLS") encryption. Upon transmission of the search query from the device 12, the NSHM will dispatch a query to a remote database corresponding to the data query; the database search result will be subsequently transmitted to the device 12 preferably utilizing the above-described communication method.

FIG. 8A illustrates one embodiment of the identification query and/or search process, wherein one of the objects of the process is to determine whether a subject of a query/search is on a hotlist, DPL or other similar database subset.

Initially, at step 222, an operator captures a plurality of demographic and/or biometric data from a subject under investigation or query. Upon obtaining data from a subject, at step 224, a plurality of remote databases are searched against the captured data. If a remote search is not available due to the location of an operator as previously described, then at step 226, a local search is performed against the plurality of databases stored within the device 12. At step 228, a query result is obtained and provided to the operator regarding the identification of the subject.

FIG. 8B illustrates one embodiment of the verification query and/or authentication process, wherein one of the objects of the process is to authenticate a plurality of credentials in the possession of a subject, and to determine if the credentials belong to the subject.

Initially at step 230, an operator capture's a plurality of biometric and authentication information from a subject, including but not limited to the subject's fingerprint, credential number (i.e. passport etc.) and other authentication information. Upon capturing a subject's credential information, at step 232 the subject's information is authenticated use a plurality of local databases stored on the accessory device 12. Where the biometric data is stored on the credential, at step 234 the subject's credentials are verified using a locate search/database query. If the reference fingerprint is stored on the credential, the device 12 compares the reference print to the captured fingerprint. However, where the biometric data is not stored on the credential, at step 236 the subject's credentials are verified using a remote search/database query. If the reference print isn't stored on the credential, then the device 12 transmits the captured fingerprint and credential information to the remote database via a data transfer medium 14. Following the search/query, at step 238 the query result is generated in regards to the authenticity of the subject's credentials. Therefore, if the authentication fails, then the operator will be warned, however after a successful authentication, the process may continue.

FIG. 8C illustrates a flow diagram of one embodiment of the process for a reconnection between the device 12, and a data transfer medium 14, if the connection is lost. During the field operations the connection between the device 12 and the data transfer medium 14 may be lost. In case of such an event a re-connection shall be made by the operator. At step 240, the operator must submit a fingerprint, and wherein at step 242 the operator is authenticated as described earlier, primarily through the operator's fingerprint. At step 244, the accessory device 12 and the data transfer medium 14 are reconnected for usage.

Figure 9:
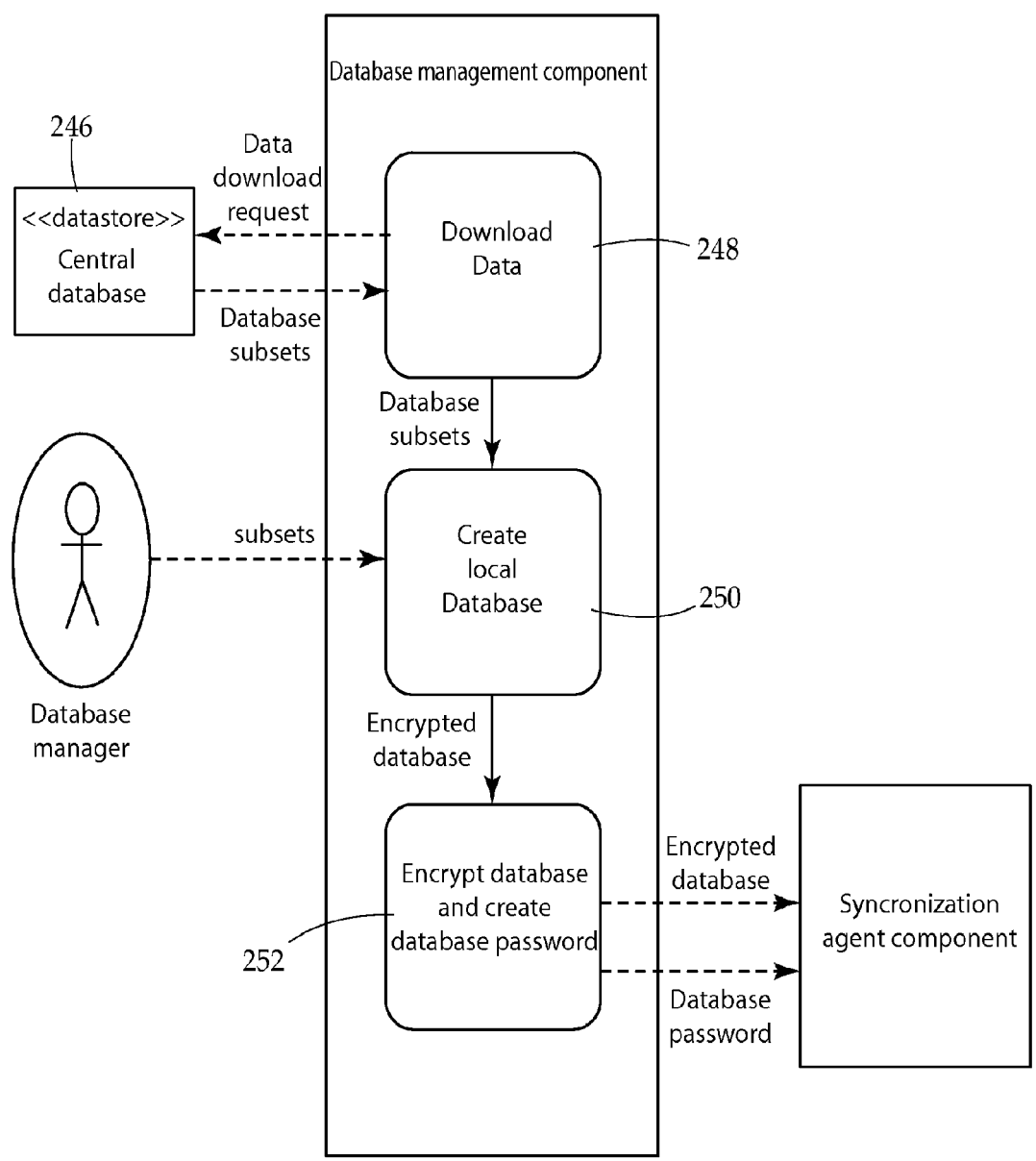
FIG. 9 is a flow diagram illustrating database management of the instant invention.

FIG. 9 illustrates a flow diagram for one embodiment of database management for the plurality of local databases stored within the device 12. The plurality of local databases housed within the device 12 provide an operator with the ability to perform searches, coupled with the ability to utilize this feature in case of a remote connection problem or when a fast response for an identification/verification request is required.

The local database is preferably a part of a larger central database 246, wherein the central database may contain blacklisted/wanted persons, a biometric database with fingerprint data, or a database that contains blacklisted passports, ID cards. Conversely, the plurality of databases located on the device 12 database is a limited size database, wherein a plurality of basic information shall to be provided by the operator. As such, an operator may transform the local database of the device 12 into a format which will be used during field operations for the operator.

At step 248, a plurality of data is downloaded after a data download request is transmitted to the central database 246. Upon receiving the plurality of data, at step 250 a plurality of local databases are created based on the data downloaded. At step 252, after the local database is created by a database manager, the database is then encrypted with a password which is generated by the database manager. At step 254, the database management component sends the encrypted database files and the related password together to a synchronization agent.

In one embodiment, the databases are stored by SQL CE on the device 12. The database files are encrypted with an AES128 method that is provided by the database engine. The device 12 encrypts the database passwords and stores them on the built-in SAM module. In a situation where the device 12 detects that a Bluetooth® connection may be possibly compromised (the connection interrupted, or decoupling), the device 12, deletes the passwords from the RAM of the device 12.

Figure 10A:
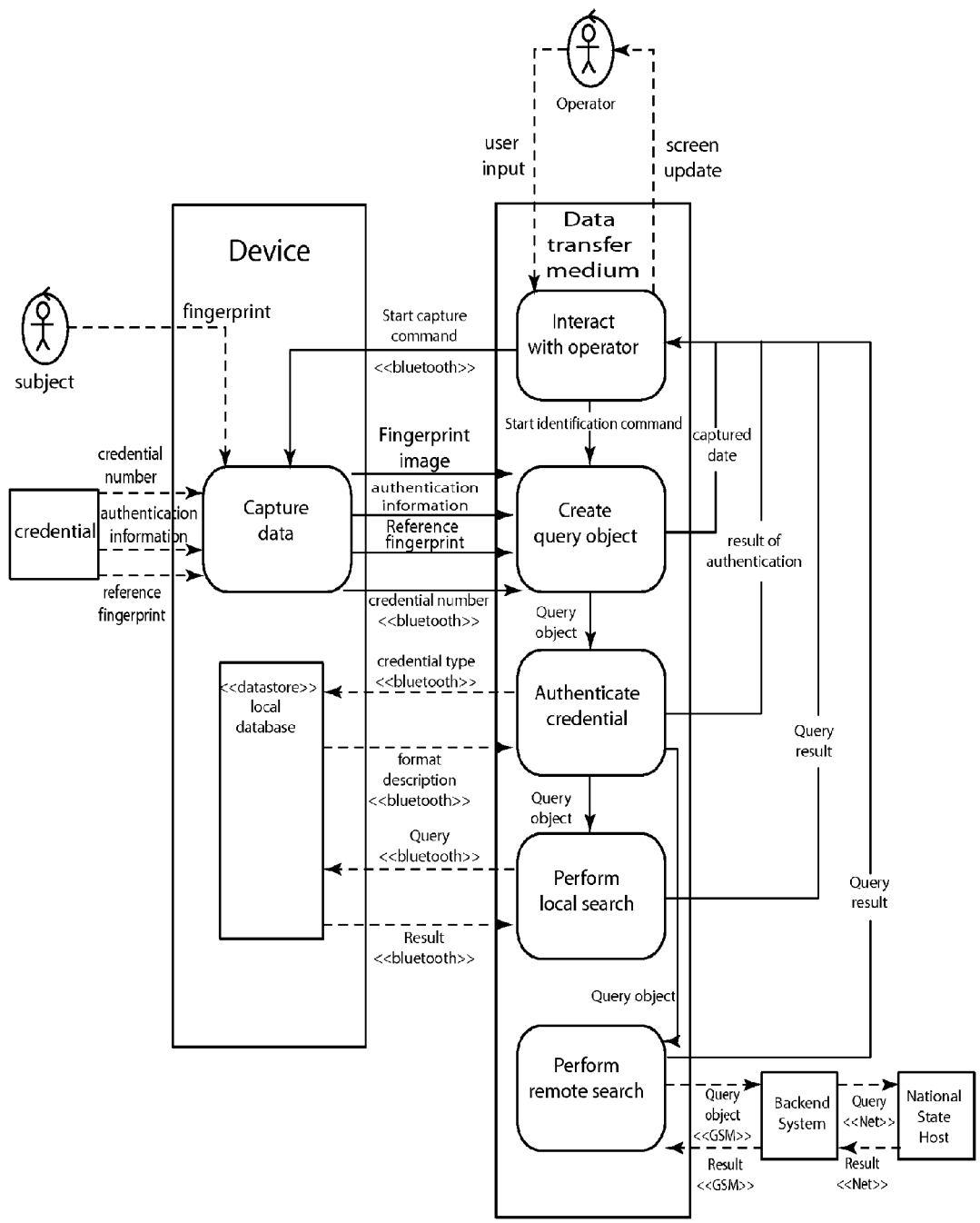
FIG. 10A is a flow diagram illustrating one embodiment of an operator of the instant invention performing an identification query search.
Figure 10B:
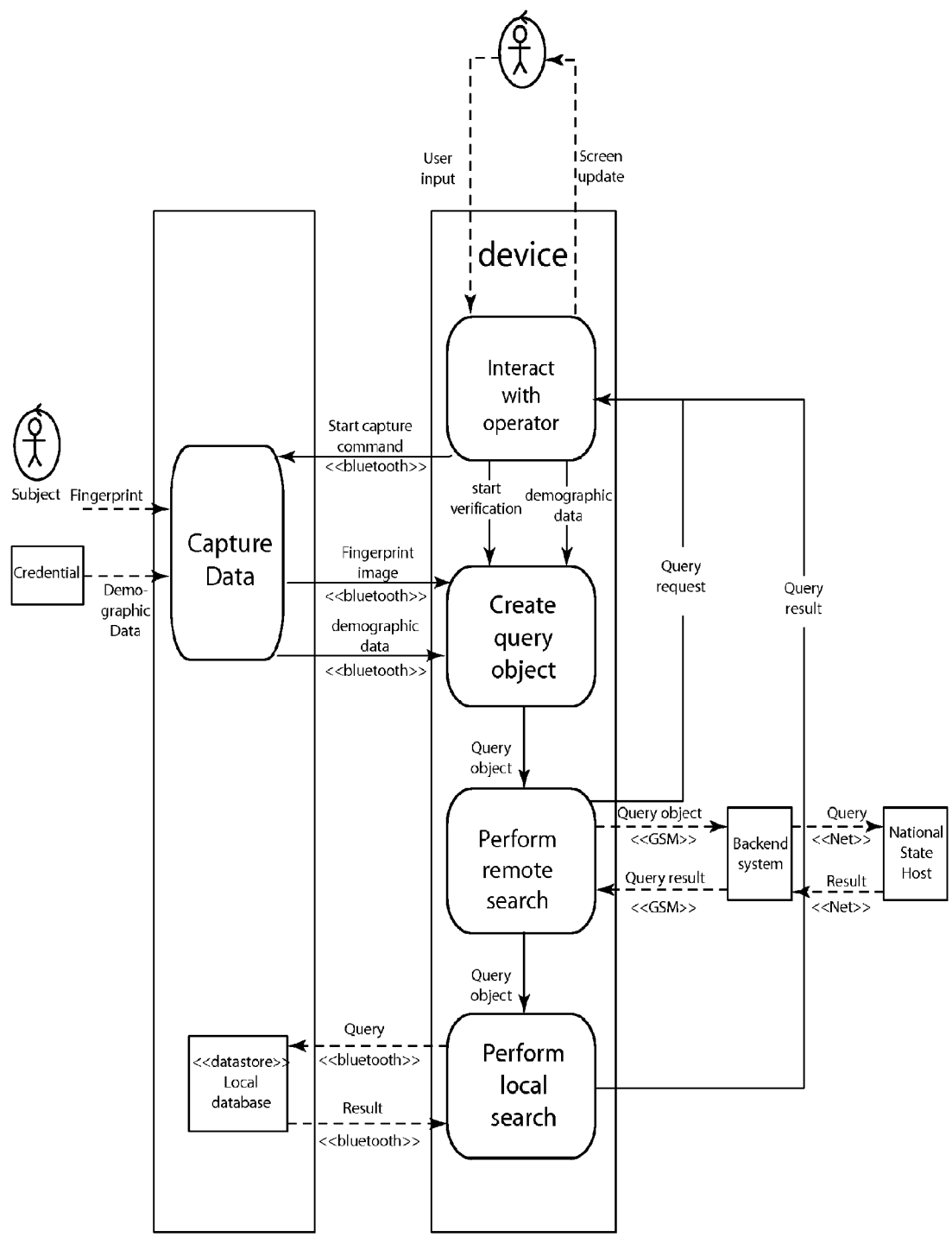
FIG. 10B is a flow diagram illustrating one embodiment of an operator of the instant invention performing a verification query search.
Figure 10C:
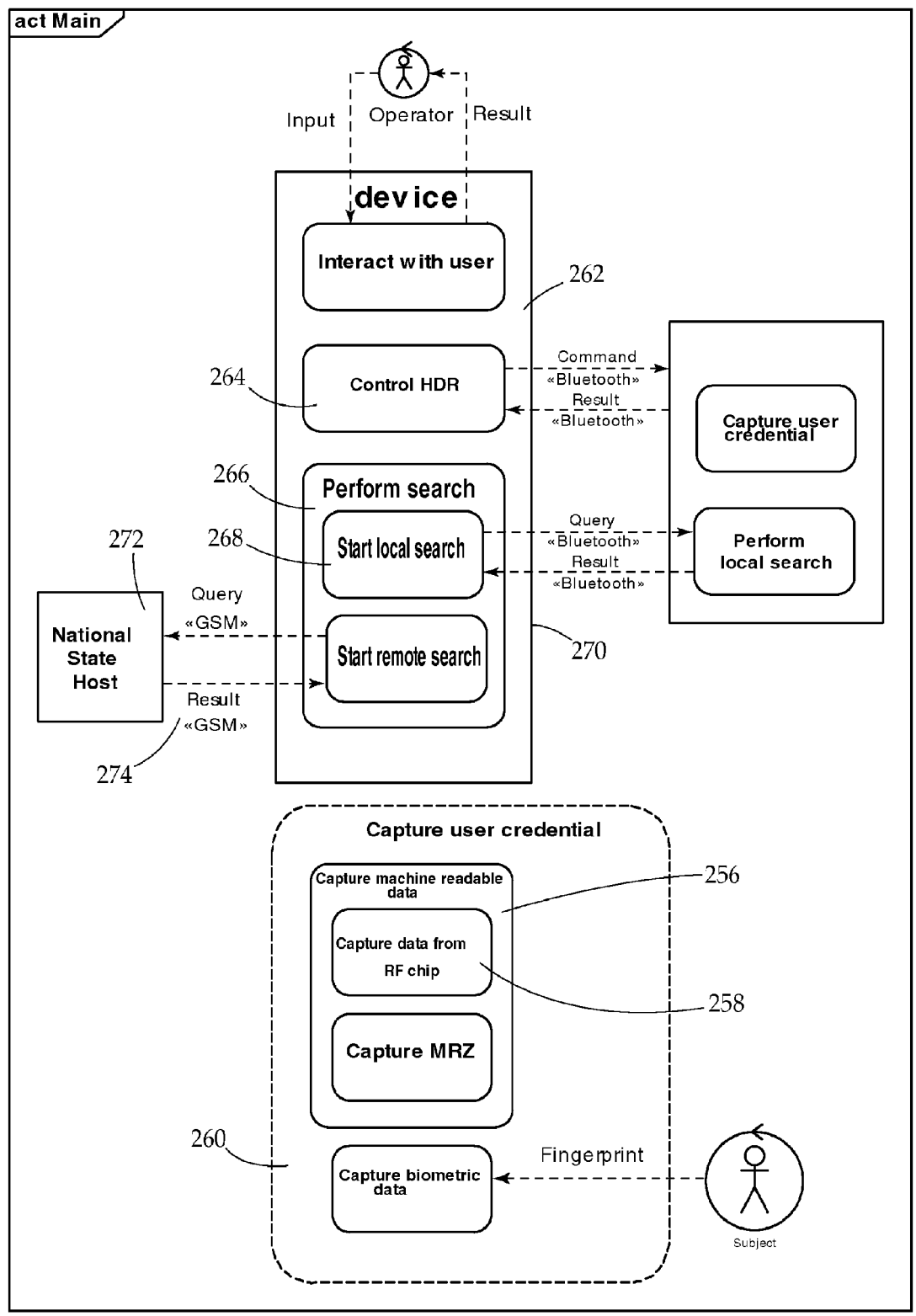
FIG. 10C is a flow diagram illustrating one embodiment of the process for capture of a user credential and processing through a local and remote database by the device.

FIG. 10A through 10C illustrate various embodiments for the capture of a subject's credentials and/or biometric data through an identification/verification query for a plurality of either local or remote databases. FIGS. 10A and 10B build upon and display the process previously described in FIGS. 8A and 8B.

FIG. 10C illustrates a flow diagram displaying the overall process from the viewpoint of the device 12, preferably for the capture of biometric and demographic data from a subject, and subsequently performing a variety of search queries for identification and/or verification purposes.

Initially, at step 256 the operator of the device 12 scans the MRZ of a subject's credential (in this embodiment a credential includes but is not limited to identification or a passport). Following scanning of the MRZ of a subject's credential, the device 12 is disposed to decode the MRZ and include this content in the subject's file. Subsequently, at step 258 the operator determines if there is a chip on the subject's credential to be read, and includes this content in the subject's file. At step 260, the operator determines if it is necessary to capture a fingerprint of the subject, and if so, a plurality of fingers are disposed to be scanned, and then added to the subject's file. Finally at step 262, the subject's file is closed, packed and transmitted over to the data transfer medium 14.

At step 264, the data transfer medium 14 receives the subjects file from the device 12 and unpacks the file. A workflow selection list may be displayed on the device 12, wherein the operator possesses the ability to determine the search query to be performed. In one embodiment, at step 266, the operator may select one of the following searches to be performed:
  Name
  Other demographics
  FP local
  FP remote At step 268, when the operator selects a local database search, the device 12 transmits a search object. At step 270 a response to the local database search is by the accessory device 12 for review by the operator. At step 272, when the operator requests a remote search, the subject's file is packed and transmitted to a National State Host, a Central Data Base and/or an AFIS. Lastly, at step 274, a response to the remote database search is transmitted to the device 12 and stored in the subject's file.

Figure 11:
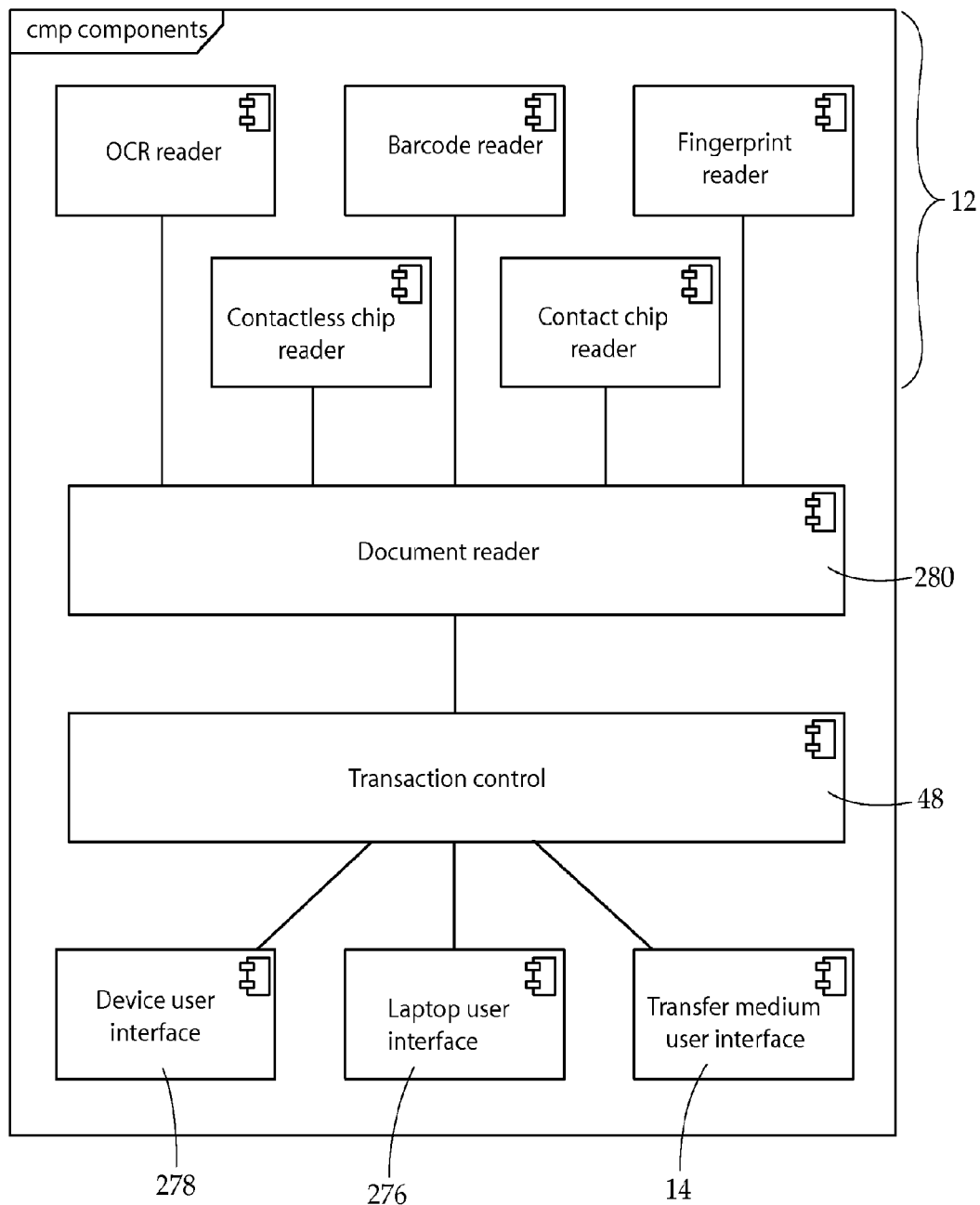
FIG. 11 is a block diagram illustrating a variety of interfaces between the device, a data transfer medium and a plurality of user interfaces to allow an operator to communicate with each layer of the instant invention.

FIG. 11 illustrates a flow diagram of a variety of interfaces between the device 12, a data transfer medium 14 and a plurality of user interfaces to allow an operator to communicate with each layer of the instant invention.

In one embodiment, the device 12 is disposed to possess a system of configurable software 278, wherein the software and the various functions associated with the software, are utilized to support the device 12 when in use by an operator. Preferably, the configurable software is utilized by a variety of operators, including law enforcement agencies, preferably for providing information about an individual, a plurality of vehicles and/or property. In one embodiment, the configurable software 278 is disposed to provide an interface to the device 12, preferably in order to capture a plurality of data from identification documents, or a plurality of biometric data, including a subject's fingerprints. As described in a previous section, the information obtained from a subject by an operator may be processed by the configurable software 278, thereby enabling the operator to conduct either a local or remote search related to the subject. Furthermore, the searches can be performed in a centralized database, or locally by using the local databases of the device 12.

In one embodiment, the communication channel between the configurable software 278 and the device 12 is a TCP/IP (UDP optionally), wherein the bandwidth may be as low as 19.2 kbps.

Furthermore, in one embodiment, the configurable software is disposed to be in data communication with the device 12 via a Bluetooth® connection. Subsequent to establishing a connection to the device 12 via the configurable software, the application preferably is designed to be easy to use, and not require a significant amount of training for use by an operator.

As described in a previous section, preferably for the device 12 to be operational, the device 12 should be paired with a data transfer medium 14 to allow for communication with a plurality of remote databases 30; in one embodiment, the device 12 may be paired with including but not limited to a laptop 276 and the data transfer medium 14 simultaneously. In this embodiment, a data connection with the laptop 276 should take preference over the data transfer medium 14.

In one embodiment the device 12 possesses a plurality of functions and search queries including, but not limited to the following:

Authentication

A biometric based operator authentication shall be performed on each logon, by capturing the fingerprint of the operator with the device 12 and performing a match against the fingerprint internally stored on the device 12.

Query Local or State Databases

The configurable software 278 shall provide a user interface for querying both a local or remote (federal or state) database. The main queries include, but are not limited to:
  Person: requesting a plurality of information about a person by using his/her identification document, geographical data, or biometric identifiers (fingerprint).
  Vehicle: requesting a plurality of information about a vehicle by using vehicle identifiers (license plate, VIN, etc).
  Property: requesting a plurality of information about a property by using its serial number and type.

Gun: requesting a plurality of information about a gun by using its serial number.

Messaging

Furthermore, the SIED 48 located on the device 12 is disposed to provide an email messaging feature for a plurality of operators, wherein the configurable software 278 may provide a user interface for the messaging, in which an operator may send email messages to a plurality of other operators. The sender may see whether the recipient or recipients are logged in to the system, and when the recipient or some of the recipients are not logged in, they will receive the message the next time they logon. Preferably, the messages are stored on the SIED 48 and are deleted only by an operator request. Furthermore, the SIED 48 is configured to dispatch asynchronous messages between the operators of the devices 12, and wherein the messaging service is preferably a closed system, where operators can send and receive messages only in the boundaries of the system.

Query about a Person

The identity of a person, his/her presence on local or remote databases can be performed in various ways. This section describes the type of queries which may be implemented by the configurable software 278.

AFIS

The AFIS based query is a fingerprint search, wherein preferably the two index fingers are captured by the device 12. The configurable software 278 is disposed to implement a graphical user interface 280 (GUI) on the device 12 for the fingerprint capture process, indicating the shape of a human hand. The captured prints shall be sent to the appropriate service of the SIED 48 as an email attachment, wherein the subject of the email should be the human readable identifier.

Name Search

A query may be made with a plurality of demographic information about an individual, wherein the configurable software 278 shall implement a GUI for the Name Search process. A plurality of fields may be provided, including but not limited to:

Last name, first name (mandatory fields).
State: the state that possibly has records on the person.

The following data fields should be filled in, if possible, for better filtering of the result list:

Sex: should be selectable from a list. (Female, Male, Unknown)
Race: may be selectable from a list, including but not limited to: American Indian, Asian, Black, unknown, White, and/or Hispanic.
Date of birth (DoB): should be entered in a format specified by the state. The format specification must be indicated to the operator.
City: the city where the person resides.

Identification Document Check

The identity of a person may be checked by validating his/her identification document. Furthermore queries may also be performed by using the information captured from an identification document. The configurable software 278 may implement a GUI for capturing information from an identification document, presenting the captured data to the operator, validating and indicating the result of the machine readable data to the operator. At least the following identification document processing may be supported:

Travel Document/Passport Check

Biometric passports or e-passports combine paper and electronic data storage that contain demographic and biographic data of the holder. The device 12 is disposed to be able to collect this information from the passport itself. In one embodiment, the process for information collection may include the following steps:

1. After selecting a passport option, the accessory device first scans the Machine Readable Zone (MRZ) of the passport. This may be accomplished by sliding the correct page (which contains the MRZ) through an indenture on the side of the device 12.
2. If the passport is an e-Passport, the next step is the scan of a contactless chip which may be accomplished by holding the e-Passport to the area that contains the RFID antenna in the device 12.
3. Following the scanning of the contactless chip, a live fingerprint or fingerprints may be captured. If the passport chip contains fingerprint data this enables the device 12 to perform a 1:1 fingerprint matching query. Additionally, the captured (live or read from the chip) fingerprints may be utilized during an AFIS search.

A passport verification success means that the subject is the entity described by the scanned passport, and the passport is valid. Further searches may be performed with the data collected about the person. These searches include but are not limited to: name search, and fingerprint search.

Personal ID

A query may be started by scanning an MRZ on Personal Identification (Personal ID) Card of the person. Data stored in the MRZ (name, date of birth, etc.) of the ID card can be used to perform searches against the state database.

Drivers License

Filling out the fields for a name search may be done automatically, if the operator can capture the barcode which is located on most United States Driver's Licenses. This function should perform the same query that name search does, only speeding up the data capturing process.

Vehicle

License Plate

Searching may be performed against the state database with by license plate information. In order to perform the query a plurality of fields may be required, including but not limited to:

Plate number: the number printed on the license plate.
State: the state that issued the license plate. The state/abbreviation of the state must be selectable from a drop-down list.

In order to refine the search the following optional fields may be present in the GUI 280:

Style: the style of the vehicle should be selectable from a list. Available styles are: partitioned, commercial, motorcycle, passenger (should be selected as default), reciprocity, trailer, truck.
Year: the year the license plate was issued. The default value must be the current year.

The license plate search yields results found on the specified vehicle. If a license plate search yields results, searches for the owner's records should be easily performed.

Vehicle Identification Number

Searches may be performed to find data records about vehicles that do not have license plates or have false license plates. To execute a query, a plurality of data fields should be present, including but not limited to:

Vehicle Identification Number (VIN): a unique identification number entered in the car by the manufacturer.
State: the state that possible has information on the vehicle.

The following fields are optional, but can be filled in order to increase the accuracy:

Make: the manufacturer of the vehicle. Should be selectable from a list, but can be left blank.

Year: the year in which the vehicle is registered. Must default to the current year.

Boat

The operator can perform a search for records stored on boats. The following information is required to perform the transaction:

Hull number: the serial number provided by the manufacturer of the boat.

Registration number: the registration number of the boat.

State: the state which registered the boat.

A search performed with information on a boat yields records the agencies has about the specified boat.

Query about Property

Searches may be performed to find records on various stolen objects. Data fields that must be filled in are:

Serial number: serial number provided by the manufacturer.

Type: the type of the searched object, which should be selectable from a list.

Data records found describe the specified object, and its state if applicable (stolen/lost property, other).

Query about Gun

Searches may be performed to find data on registered guns. The search will yield records on the specified gun. The following data fields must be entered to successfully perform the search:

Serial number: the serial number embedded in the gun itself.

Other optional data fields include, but are not limited to:

Caliber: caliber information can be filled in. The data must be provided in a format the state specifies.

Make: the manufacturer of the gun. This should be selectable from a list, and can be left blank.

The query run with the data of a gun results in records found on the specified weapon.

Query Responses

When a response arrives for a query, the operator should receive a visible or an audible notification. Responses are grouped by search transaction, wherein the responses are preferably deleted manually, but when the operator logs off all the data should be purged from the devices. Furthermore, in one embodiment, responses may be textual data, and should be parsed to find key words to highlight them.

Security

The configurable software 278 and the device 12 work in conjunction with a plurality of sensitive data; therefore a plurality of security features should be implemented in order to prevent the disclosure of this information. These responses must be safely deleted when the operator performs a logout operation. The operator should prevent unauthorized use of the device 12, but in case of theft the device 12 is disposed to perform a re-authentication of the operator preferably after five minutes of inactivity. In addition, transmissions between the accessory device 12 and the SIED 48 may be vulnerable to attacks such as eavesdropping or falsifying, therefore the communication should be encrypted; the encryption should achieve security of 256 bit AES by the FIPS 140-2 standard.

Preferably, the device 12 enables government agency officers to capture data from the documents of the subjects, or capture live fingerprints in the field. These data then can be processed to enable the officer to conduct searches related to the subject.

To achieve these functions the following software components must exist in the accessory device 12:

Sensor devices: the hardware required to perform data capture are integrated to the device 12, as previously described include: fingerprint reader, OCR reader, barcode reader, contactless chip reader and contact chip reader. To be able to use the sensor hardware, low level controlling software components must be present in the device 12.

Document reader component: software parts are needed to perform capturing and processing the data embedded in various documents or the fingerprint capturing process. This component contains all the necessary knowledge to process a specific document.

Transaction control: to perform searches or verifications of the collected data (either read from a document or acquired through user input) a transaction controller component is needed. This software part coordinates the execution of the queries either locally or remotely and processing the results of these transactions.

User interfaces: the user interface components provide the means by which the operator can interact with the system. The system can communicate with the user through these user interfaces:

Device user interface

Laptop user interface

Data Transfer Medium interface

The transaction control component resides in the data transfer medium 14 and the document reader component is located on the accessory device 12. The device 12 preferably is disposed to present a list of documents the device may read, and allows the operator to select one. The device 12 then executes the necessary steps to read all data from the document by operating the various sensor devices. The processed data captured by the device 12 is utilized to populate the data fields for the actual search.

Client Communication

The operator may only access the features of the device 12 if a data connection is established between the accessory device 12 and the data transfer medium 14. Once a data connection is established, the device 12 may send a plurality of requests to a plurality of remote databases for the identification or verification of an individual and/or documents. The requests and the responses generated by the device 12 may be encoded in individual messages, and wherein the device 12 is disposed to transmit a response message for most of the requests, but some requests do not generate a response, or may generate multiple response messages.

Layers

Preferably, a communication channel between the accessory device 12 and the data transfer medium 14 is divided into separate layers. These layers include but are not limited to:

Bluetooth® communication: all the communication is transmitted through a Bluetooth® connection.

TLS: the communication channel is protected by TLS version 1.2.

Messaging layer: this layer performs the necessary serialization/deserialization of the messages. The messages are ASN.1 DER encoded.

Application layer: messages are processed in this layer; this layer contains all the application and business logic.

Protocol Description

The device 12 is disposed to await a plurality of incoming connection requests, and then communicate using the following protocol phases, including, but not limited to:

Connect: a TLS handshake operation is performed to establish secure communication through the open Bluetooth channel. The device 12 and the data transfer medium 14 should utilize the communication certificates distributed in the pairing process.

Access features: in this phase the data transfer medium 14 may access the features provided by the device 12. This may be performed by exchanging messages through the secure channel. For most requests the device 12 generates a single response, but for some requests it may generate more or even zero response.

Disconnect: after closing the underlying TLS and Bluetooth channel, the connection is dropped.

Therefore, in summary the instant invention discloses a variety of unique solutions for the secure pairing and operation of between a device and a data transfer medium through a secure information exchange device located on the device, which is disposed to function as a trusted element that the device and the data transfer medium utilize to establish and to operate in a secure encrypted method.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

We claim:

1. A method to transfer and control a set of transactions designated to be performed by a data transfer medium in a system to an intelligent peripheral device comprising the steps of:
    authenticating the intelligent peripheral device and the data transfer medium by a secure information exchange device, wherein the step of authenticating further comprises:
        reading a plurality of authentication data of the intelligent peripheral device by the secure information exchange device;
        reading a plurality of authentication data of the data transfer medium by the secure information exchange device;
        comparing the digital certificate of the intelligent peripheral device by the secure information exchange device against an external certificate authority root certificate;
        comparing the digital certificate of the data transfer medium by the secure information exchange device against an external certificate authority root certificate;
        verifying the digital certificate of the intelligent peripheral device by the secure information exchange device;
        verifying the digital certificate of the data transfer medium by the secure information exchange device;
        searching a device database by the secure information exchange device for the intelligent peripheral device and the data transfer medium;
        enrolling the intelligent peripheral device and the data transfer medium in the device database;
        approving the authentication of the intelligent peripheral device and the data transfer medium once they are enrolled in the device database;
    creating a trusted and encrypted environment between the intelligent peripheral device and the data transfer medium for the transfer of information through a pairing of the intelligent peripheral device to the data transfer medium by the secure information exchange device, wherein the step of pairing further comprises:
        capturing a fingerprint of an operator of the intelligent peripheral device to authenticate the operator by the secure information exchange device;
        transmitting a digital certificate of the secure information exchange device to the intelligent peripheral device and data transfer medium;
        authenticating the digital certificate of the secure information exchange against the root certificate of the external certificate authority by the intelligent peripheral device and data transfer medium;
        verifying the secure information exchange device by the intelligent peripheral device and data transfer medium;
        generating concurrently a key pair comprising a public key and a private key by the intelligent peripheral device and a key pair comprising a public key and a private key by the data transfer medium;
        transmitting the public key of the device and the data transfer medium to the secure information exchange device;
        transmitting a data communication address from the device and the data transfer medium to the secure information exchange device;
        transmitting the public keys of the device and the data transfer medium by the secure information exchange device to an external certificate authority device;
        receiving a signed certificate by the secure information exchange device from the external certificate authority;
        signing each certificate by the secure exchange information device with the private keys of the device and the data transfer medium;
        generating a random string by the secure information exchange device;
        utilizing the random string generated by the secure information exchange device as a password by the intelligent peripheral device and the data transfer medium;
        uploading the intelligent peripheral device certificate, the data transfer medium certificate, the data transfer medium address and the password to the intelligent peripheral device;
        storing the pairing of the intelligent peripheral device and the data transfer medium in a database on the secure information exchange device following a successful pairing;
    transferring control of the set of transactions designated to be performed by the data transfer medium in the system to the intelligent peripheral device following successful pairing of the intelligent peripheral device and the data transfer medium.

2. The method to transfer and control a set of transactions designated to be performed by a data transfer medium in a system to an intelligent peripheral device of claim 1, wherein the intelligent peripheral device further comprises:
    a biometric authentication module, wherein the biometric authentication module is disposed to capture a plurality of an individual's fingerprints;
    an optical character recognition reader;
    a radio frequency identification reader, wherein the radio frequency identification reader is disposed to read a plurality of contactless chips located within an electronic passport and further comprises an antenna;
    an optical document scanner, wherein the optical document scanner is disposed to capture a plurality of data contained with a plurality of documents in possession by an individual;

a secure access module, wherein the secure access module is disposed to interface with a data transfer medium to allow for the secure transfer of information to a plurality of remote databases;

a machine readable zone reader;

a wireless communications module, wherein the wireless communications module is disposed to allow for data communication with a plurality of remote databases through a data transfer medium; and a plurality of data storage modules within said biometric authentication module, wherein the plurality of data storage modules are disposed to be in data communication with a plurality of remote databases to allow for updating of the of databases stored on the device;

an optical character recognition reader, wherein the optical character recognition reader is disposed to translate a plurality of scanned images into a plurality of machine-encoded text;

wherein the radio frequency identification reader, the biometric authentication module, the optical character recognition reader, the optical document scanner, the secure access module, the machine readable zone reader, the wireless communications module and the plurality of data storage modules are in electronic communication.

3. The intelligent peripheral device of claim 2, wherein the intelligent peripheral device be is in data communication with a plurality of databases.

4. The intelligent peripheral device of claim 2, wherein the intelligent peripheral device allows for a plurality of biometric and non-biometric search and match functions for the identification and verification of a plurality of individuals.

5. The intelligent peripheral device of claim 2, wherein the intelligent peripheral device allows for a remote identification and verification of a plurality of individuals.

6. The intelligent peripheral device of claim 2, wherein the intelligent peripheral device allows for the identification and verification of a plurality of individuals and documents through the plurality of data storage modules stored on the intelligent peripheral device.

7. The intelligent peripheral device of claim 4, wherein the non-biometric functions of identification and verification are selected from the group consisting of: name, vehicle registration, weapon registration, driver's license, vehicle VIN and Visa.

8. The intelligent peripheral device of claim 7, wherein the intelligent peripheral device allows for the authentication of a secure credential located within a document.

9. The intelligent peripheral device of claim 8, wherein the secure credential is located within a document selected from the group consisting of: electronic passport, standard passport, National identification, driver's license and any other government issued credentials.

10. The intelligent peripheral device of claim 2, wherein the plurality of data storage modules stores database information selected from the group consisting of: denied person's list, watch list and fingerprint list.

11. The intelligent peripheral device of claim 2, wherein the data storage modules are encrypted and deleted upon tampering by an individual without proper authorization.

12. A method for the identification of an individual utilizing the intelligent peripheral device of claim 2, the steps comprising:

scanning a plurality of a subject's credential's using the machine readable zone reader of the intelligent peripheral device;

decoding the plurality of credential's by the intelligent peripheral device;

selecting a search query by the intelligent peripheral device;

transmitting a search request by the intelligent peripheral device; and receiving a response to the search request by the intelligent peripheral device.

13. The method for the identification of an individual utilizing the intelligent peripheral device of claim 2, further comprising the step of:

determining whether a chip is present on the subject's credential's by an operator of the intelligent peripheral device; and reading the chip by the radio frequency identification reader on the intelligent peripheral device when the chip is present.

14. The method for the identification of an individual utilizing the intelligent peripheral device of claim 2, further comprising the step of:

capturing a plurality of a subject's fingerprints using the biometric authentication module.

15. The method for the identification of an individual utilizing the intelligent peripheral device of claim 2, further comprising the step of:

packaging a subject's information into a file; and transmitting the file to a plurality of remote databases.

16. The method of claim 12, further comprising the step of:

selecting a local database search by an operator of the intelligent peripheral device;

transmitting a search request by the intelligent peripheral device; and transmitting a response to the search request to the intelligent peripheral device.

17. The method of claim 12, wherein the search query is selected from the group consisting of: a person, a vehicle, a property, a boat and a gun.

18. The method of claim 17, wherein the search query for a person is disposed to include a plurality of search parameters selected from the group consisting of: first name, last name, state, sex, race, data of birth and city.

19. The method of claim 12, wherein the search query is disposed to identify an individual by validating a plurality of documents, further comprising the steps of:

selecting a document option on the intelligent peripheral device;

scanning a machine readable zone on the document by the intelligent peripheral device; and transmitting the information contained within the machine readable zone to the plurality of remote databases by the intelligent peripheral device.

20. The method of claim 19, wherein the document is selected from the group consisting of: a passport, an electronic passport, personal identification and a driver's license.

21. The method of claim 19, further comprising the step of:

scanning a contactless chip contained within the document; and transmitting the information within the contactless chip to the intelligent peripheral device.

22. The method of claim 19, further comprising the step of:

capturing a plurality of a subject's fingerprint's;

determining whether the document includes a plurality of fingerprint data;

verifying the subject's fingerprint with the fingerprint data contained in the document.

23. The intelligent peripheral device of claim 2, wherein the intelligent peripheral device further comprises:

a camera;
a keyboard, wherein the keyboard is disposed to allow for the entry of a plurality of information by an operator;
a magnetic stripe reader;
a contact card reader.

* * * * *